(12) United States Patent  (10) Patent No.: US 6,679,776 B1
Nishiumi et al.  (45) Date of Patent: Jan. 20, 2004

(54) VIDEO GAME SYSTEM

(75) Inventors: Satoshi Nishiumi, Kyoto (JP); Kazuo Koshima, Kyoto (JP); Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/112,356

(22) Filed: Jul. 9, 1998

(30) Foreign Application Priority Data

Jul. 17, 1997 (JP) .............................................. 9-192166

(51) Int. Cl.$^7$ ................................................. A63F 9/22
(52) U.S. Cl. ........................ 463/36; 463/42; 273/148 B
(58) Field of Search ............................. 463/36, 37, 38, 463/39, 40, 46, 47, 48, 41, 42; 273/434, 437, 438, 439, 85 G, 148 B; D16/28, 148 R, 148 B

(56) References Cited

U.S. PATENT DOCUMENTS

| | | |
|---|---|---|
| 3,666,900 A | 5/1972 | Rothweiler et al. |
| 3,729,129 A | 4/1973 | Fletcher et al. |
| 3,827,313 A | 8/1974 | Kiessling |
| 4,148,014 A | 4/1979 | Burson |
| 4,161,726 A | 7/1979 | Burson et al. |
| 4,315,113 A | 2/1982 | Fisher et al. |
| 4,359,222 A | 11/1982 | Smith, III et al. |
| 4,469,330 A | 9/1984 | Asher |
| 4,485,457 A | 11/1984 | Balaska et al. |
| 4,538,035 A | 8/1985 | Pool |
| 4,552,360 A | 11/1985 | Bromley et al. |
| 4,575,591 A | 3/1986 | Lugaresi |
| 4,587,510 A | 5/1986 | Kim |
| 4,639,225 A | 1/1987 | Washizuka |
| 4,659,313 A | 4/1987 | Kuster et al. |
| 4,685,678 A | 8/1987 | Frederiksen |
| 4,748,441 A | 5/1988 | Brzezinski |
| 4,783,812 A | 11/1988 | Kaneoka |
| 4,789,932 A | 12/1988 | Cutler et al. |
| 4,799,677 A | 1/1989 | Frederiksen |

(List continued on next page.)

FOREIGN PATENT DOCUMENTS

| | | |
|---|---|---|
| AU | 90881/91 | 5/1992 |
| DE | 32 04 428 A1 | 8/1983 |
| DE | 40 18 052 | 12/1990 |
| EP | 268 419 | 5/1988 |
| EP | 0 431 723 A2 | 6/1991 |
| EP | 0 470 615 | 2/1992 |
| EP | 553 532 | 8/1993 |
| EP | 685 246 | 12/1995 |
| EP | 724 220 | 7/1996 |
| EP | 0 835 802 | 4/1998 |
| EP | 0 867 212 | 9/1998 |

(List continued on next page.)

OTHER PUBLICATIONS

US 5,833,539, 11/1998, Sinohara (withdrawn)*
6 Photographs of Sony PlayStation: 1) top case and compact disk; 2) hand controller; 3) internal circuit boards (top view); 4) internal circuit boards (top view); 5) compact disk reader (bottom view); and internal main circuit board (bottom view).
*Knuckles Chaotix Instruction Manual*, Sega, Redwood City, California, #84503 (1995).

(List continued on next page.)

*Primary Examiner*—Carl J. Arbes
*Assistant Examiner*—Minh Trinh
(74) *Attorney, Agent, or Firm*—Nixon & Vanderhye, PC

(57) ABSTRACT

A video game system includes a video game machine, a memory medium and a controller. A CPU included in the video game machine detects a vibration generating condition that a player object comes into collision or contact with an enemy object or a stationary object. If the vibration generating condition is detected, the CPU drives a vibration source included in the controller, thereby generating vibration on the controller.

25 Claims, 16 Drawing Sheets

U.S. PATENT DOCUMENTS

| Patent | | Date | Inventor | Ref |
|---|---|---|---|---|
| 4,858,930 | A | 8/1989 | Sato | |
| 4,868,780 | A | 9/1989 | Stern | |
| 4,875,164 | A | 10/1989 | Monfort | |
| 4,887,230 | A | 12/1989 | Noguchi et al. | |
| 4,887,966 | A | 12/1989 | Gellerman | |
| 4,890,832 | A | 1/1990 | Komaki | |
| 4,916,440 | A | 4/1990 | Faeser et al. | |
| 4,924,216 | A | 5/1990 | Leung | |
| 4,926,372 | A | 5/1990 | Nakagawa | |
| 4,933,670 | A | 6/1990 | Wislocki | |
| 4,949,298 | A | 8/1990 | Nakanishi et al. | |
| 4,974,192 | A | 11/1990 | Face et al. | |
| 4,976,429 | A | 12/1990 | Nagel | |
| 4,976,435 | A | 12/1990 | Shatford et al. | |
| 4,984,193 | A | 1/1991 | Nakagawa | |
| 5,001,632 | A | 3/1991 | Hall-Tipping | |
| 5,012,230 | A | 4/1991 | Yasuda | |
| D316,879 | S | 5/1991 | Shulman et al. | |
| 5,014,982 | A | 5/1991 | Okada et al. | |
| D317,946 | S | 7/1991 | Tse | |
| 5,046,739 | A | 9/1991 | Reichow | |
| 5,095,798 | A | 3/1992 | Okada et al. | |
| 5,160,918 | A | 11/1992 | Saponsnik et al. | |
| 5,203,563 | A | 4/1993 | Loper, III | |
| 5,207,426 | A | 5/1993 | Inoue et al. | |
| 5,213,327 | A | 5/1993 | Kitaue | |
| 5,226,136 | A | 7/1993 | Nakagawa | |
| 5,237,311 | A | 8/1993 | Mailey et al. | |
| 5,245,320 | A | 9/1993 | Bouton | |
| 5,259,626 | A | 11/1993 | Ho | |
| 5,273,294 | A | 12/1993 | Amanai | |
| 5,276,831 | A | 1/1994 | Nakanishi et al. | |
| 5,286,024 | A | 2/1994 | Winblad | |
| 5,290,034 | A | 3/1994 | Hineman | |
| 5,291,189 | A | 3/1994 | Otake et al. | |
| 5,317,714 | A | 5/1994 | Nakagawa et al. | |
| 5,327,158 | A | 7/1994 | Takahashi et al. | |
| 5,329,276 | A | 7/1994 | Hirabayashi | |
| 5,337,069 | A | 8/1994 | Otake et al. | |
| 5,357,604 | A | 10/1994 | San et al. | |
| 5,358,259 | A | 10/1994 | Best | |
| 5,371,512 | A | 12/1994 | Otake et al. | |
| 5,388,841 | A | 2/1995 | San et al. | |
| 5,388,990 | A | 2/1995 | Beckman | |
| 5,390,937 | A | * 2/1995 | Sakaguchi et al. | 273/434 |
| 5,393,070 | A | 2/1995 | Best | |
| 5,393,071 | A | 2/1995 | Best | |
| 5,393,072 | A | 2/1995 | Best | |
| 5,393,073 | A | 2/1995 | Best | |
| 5,394,168 | A | 2/1995 | Smith, III et al. | |
| D357,712 | S | 4/1995 | Wu | |
| 5,405,152 | A | 4/1995 | Katanics et al. | |
| 5,415,549 | A | 5/1995 | Logg | |
| 5,421,590 | A | 6/1995 | Robbins | |
| 5,426,763 | A | 6/1995 | Okada | |
| 5,436,640 | A | 7/1995 | Reeves | |
| 5,437,464 | A | 8/1995 | Terasima et al. | |
| 5,451,053 | A | 9/1995 | Garrido | |
| 5,453,763 | A | 9/1995 | Nakagawa | |
| D363,092 | S | 10/1995 | Hung | |
| 5,459,487 | A | 10/1995 | Bouton | |
| 5,473,325 | A | 12/1995 | McAlindon | |
| 5,512,920 | A | 4/1996 | Gibson | |
| 5,513,307 | A | 4/1996 | Naka et al. | |
| 5,515,044 | A | 5/1996 | Glatt | |
| 5,537,405 | A | * 7/1996 | Yoshifuji | 370/60.1 |
| 5,551,693 | A | 9/1996 | Goto et al. | |
| 5,551,701 | A | 9/1996 | Bouton et al. | |
| 5,552,799 | A | * 9/1996 | Hashiguchi | 345/3 |
| 5,558,329 | A | 9/1996 | Liu | |
| 5,563,629 | A | 10/1996 | Caprara | |
| 5,566,280 | A | 10/1996 | Fukui et al. | |
| D375,326 | S | 11/1996 | Yokoi et al. | |
| 5,577,735 | A | 11/1996 | Reed et al. | |
| 5,589,854 | A | 12/1996 | Tsai | |
| 5,593,350 | A | 1/1997 | Bouton et al. | |
| 5,607,157 | A | 3/1997 | Nagashima | |
| 5,615,083 | A | 3/1997 | Burnett | |
| 5,624,117 | A | 4/1997 | Ohkubo et al. | |
| 5,628,686 | A | 5/1997 | Svancarek et al. | |
| 5,630,170 | A | * 5/1997 | Koizumi et al. | 395/834 |
| 5,632,680 | A | 5/1997 | Chung | |
| 4,870,389 | A | 6/1997 | Ishiwata et al. | |
| 5,640,177 | A | 6/1997 | Hsu | |
| 5,643,087 | A | 7/1997 | Marcus et al. | |
| 5,649,862 | A | * 7/1997 | Sakaguchi et al. | 463/44 |
| 5,653,637 | A | 8/1997 | Tai | |
| 5,663,747 | A | 9/1997 | Shulman | |
| 5,669,818 | A | * 9/1997 | Thorner et al. | 463/30 |
| 5,670,955 | A | 9/1997 | Thorne, III et al. | |
| 5,680,534 | A | 10/1997 | Yamato et al. | |
| 5,684,512 | A | 11/1997 | Schoch et al. | |
| 5,691,898 | A | 11/1997 | Rosenberg et al. | |
| 5,704,837 | A | 1/1998 | Iwasaki et al. | |
| 5,706,029 | A | 1/1998 | Tai | |
| 5,714,981 | A | 2/1998 | Scott-Jackson et al. | |
| 5,724,497 | A | 3/1998 | San et al. | |
| 5,731,806 | A | 3/1998 | Harrow et al. | |
| 5,734,373 | A | 3/1998 | Rosenberg et al. | |
| 5,734,376 | A | 3/1998 | Hsien | |
| 5,734,807 | A | 3/1998 | Sumi | 395/127 |
| 5,759,100 | A | 6/1998 | Nakanishi | |
| 5,769,719 | A | 6/1998 | Hsu | |
| 5,784,051 | A | 7/1998 | Harrow et al. | |
| 5,785,597 | A | 7/1998 | Shinohara | |
| 5,786,807 | A | 7/1998 | Couch et al. | |
| 5,791,994 | A | 8/1998 | Hirano et al. | |
| 5,793,356 | A | 8/1998 | Svancarek et al. | |
| 5,804,781 | A | 9/1998 | Okabe | |
| 5,808,591 | A | 9/1998 | Mantani | |
| 5,816,921 | A | 10/1998 | Hosokawa | |
| 5,820,462 | A | 10/1998 | Yokoi et al. | |
| 5,830,066 | A | 11/1998 | Goden et al. | 463/33 |
| 5,838,330 | A | 11/1998 | Ajima | |
| 5,850,230 | A | 12/1998 | San et al. | |
| 5,862,229 | A | 1/1999 | Shimizu | |
| 5,867,051 | A | 2/1999 | Liu | |
| 5,877,749 | A | 3/1999 | Shiga et al. | |
| 5,880,709 | A | 3/1999 | Itai et al. | 345/113 |
| 5,896,125 | A | 4/1999 | Niedzwiecki | |
| 5,897,437 | A | * 4/1999 | Nishiumi et al. | 463/47 |
| 5,898,424 | A | 4/1999 | Flannery | |
| 5,917,266 | A | * 6/1999 | Murai et al. | 310/316 |
| 5,919,092 | A | * 7/1999 | Yokoi et al. | 463/37 |
| 5,938,531 | A | 8/1999 | Yasushi et al. | 463/23 |
| 5,946,004 | A | 8/1999 | Kitamura et al. | |
| 5,973,704 | A | 10/1999 | Nishiumi et al. | |
| 5,984,785 | A | * 11/1999 | Takeda et al. | 463/38 |
| 5,984,788 | A | * 11/1999 | Lebensfeld et al. | 463/51 |
| 5,989,120 | A | * 11/1999 | Truchsess | 463/7 |
| 5,989,123 | A | * 11/1999 | Tosaki et al. | 463/37 |
| 5,993,318 | A | * 11/1999 | Kousaki | 463/35 |
| 5,999,197 | A | * 12/1999 | Satoh et al. | 345/515 |
| 6,000,662 | A | 12/1999 | Todeschi et al. | 244/223 |
| 6,001,015 | A | 12/1999 | Nishiumi et al. | |
| 6,006,352 | A | * 12/1999 | Kitabatake | 714/752 |
| 6,007,428 | A | 12/1999 | Nishiumi et al. | |
| 6,020,876 | A | 2/2000 | Rosenberg et al. | |
| 6,022,274 | A | 2/2000 | Takeda et al. | |

| | | | |
|---|---|---|---|
| 6,034,669 A | 3/2000 | Chiang et al. | |
| 6,036,495 A | 3/2000 | Marcus et al. | |
| 6,042,478 A | 3/2000 | Ng | |
| 6,050,896 A | 4/2000 | Hanado et al. | 463/32 |
| 6,071,194 A | 6/2000 | Sanderson et al. | |
| 6,078,329 A | 6/2000 | Umeki et al. | 345/419 |
| 6,280,329 B1 * | 8/2001 | Kondo et al. | 463/43 |

FOREIGN PATENT DOCUMENTS

| | | |
|---|---|---|
| GB | 2 234 575 A | 2/1991 |
| GB | 2 244 546 | 12/1991 |
| GB | 2 263 802 | 8/1993 |
| JP | 50-22475 | 3/1975 |
| JP | 57-2084 | 1/1982 |
| JP | 57-18236 | 1/1982 |
| JP | 57-136217 | 8/1982 |
| JP | 59-40258 | 3/1984 |
| JP | 59-121500 | 7/1984 |
| JP | 61-16641 | 1/1986 |
| JP | 61-198286 | 9/1986 |
| JP | 61-185138 | 11/1986 |
| JP | 62-269221 | 11/1987 |
| JP | 62-194389 | 12/1987 |
| JP | 2-41342 | 3/1990 |
| JP | 2-68404 | 5/1990 |
| JP | 2-283390 | 11/1990 |
| JP | 3-16620 | 1/1991 |
| JP | 3-248215 | 11/1991 |
| JP | 4-26432 | 1/1992 |
| JP | 4-20134 | 2/1992 |
| JP | 4-42029 | 2/1992 |
| JP | 4-104893 | 9/1992 |
| JP | 4-291468 | 10/1992 |
| JP | 5-100759 | 4/1993 |
| JP | 5-19925 | 5/1993 |
| JP | 5-177057 | 7/1993 |
| JP | 5-241502 | 9/1993 |
| JP | 6-23148 | 2/1994 |
| JP | 6-54962 | 3/1994 |
| JP | 6-68238 | 3/1994 |
| JP | 6-110602 | 4/1994 |
| JP | 6-114683 | 4/1994 |
| JP | 6-190145 | 7/1994 |
| JP | 6-190147 | 7/1994 |
| JP | 6-205010 | 7/1994 |
| JP | 6-61390 | 8/1994 |
| JP | 6-285259 | 10/1994 |
| JP | 6-315095 | 11/1994 |
| JP | 07068052 | 3/1995 |
| JP | 07088252 | 4/1995 |
| JP | 7-104930 | 4/1995 |
| JP | 7-144069 | 6/1995 |
| JP | 7-222865 | 8/1995 |
| JP | 7-288006 | 10/1995 |
| JP | 7-317230 | 12/1995 |
| JP | 8-45392 | 2/1996 |
| JP | 9-56927 | 3/1997 |
| JP | WO97/32641 | 12/1997 |
| WO | 92/09347 | 6/1992 |
| WO | 94/12999 | 6/1994 |
| WO | 97/17651 | 5/1997 |
| WO | WO 98/16285 | 4/1998 |

OTHER PUBLICATIONS

*Nintendo Power*, vol. 30, p. 22, PilotWings article.
*Nintendo Power*, vol. 31, p. 35, PilotWings article.
*Nintendo Power*, vol. 31, pp. 74–76, PilotWings article.
*Nintendo Power*, vol. 38, p. 25, PilotWings article.
*Nintendo Power*, vol. 46, PilotWings article.
*PilotWings Instruction Booklet*, Super Nintendo Entertainment System, SNS–PW–USA, copyright 1991.
*PilotWings*, It's a Festival of Flight, Top Secret Password Nintendo Player's Guide, pp. 82–83 and 160, 1991.
*PilotWings*, Soar with the Flight Club, Super Nintendo Entertainment System Play's Guide, pp. 100–105, 1991.
*Sega Genesis 32X Instruction Manual*, Sega, Redwood City California, #672–2116 (1994).
*Sega Genesis Instruction Manual*, Sega, Hayward, California,#3701–926–0–01 (1994).
*Sonic 2 The Hedgehog Instruction Manual*, Sega, Hayward, California, #672–0944 3701–925–0–01 (1992).
Sony PlayStation Instruction Manual, and informational materials, Sony Computer Entertainment Inc. 1995.
*IBM Technical Disclosure Bulletin*, vol. 37, No. 08, Aug. 1994, pp. 73–74, "Analog Joystick Interface Emulation using a Digital Counter".
*IBM Technical Disclosure Bulletin*, vol. 33, No. 11, Apr. 1991, pp. 105–106, "Hardware Reset With Microcode Warning Period".
Super Mario 64 Player's Guide, Nintendo of America, 1996.
Nintendo Power, "The Fun Machine" for Nintendo 64.
Nintendo Power, vol. 80, pp. 20–27, Jan. 1996.
Nintendo Employee Shosinkai Reports, 14 pages, Nov. 24–26, 1995.
Sega Force/ Saturn Peripherals, Data Information, 1997–99.
Sega Force/Saturn Tech Specs, Data Information, 1997.
Drucker et al., "Cinema: A System for Procedural Camera Movements", *Proceedings of the Symposium on Interactive 3D Graphics*, Cambridge, MA., Mar. 29–Apr. 1, 1992, pp. 67–70.

* cited by examiner

VIDEO GAME SYSTEM

BACKGROUND OF THE INVENTION

1. Field of the Invention

This invention relates to video game systems. More specifically, this invention relates to a novel video game system having a vibration source provided within a controller to supply operating signals to a video game machine, generating vibrations in response to game images.

2. Description of the Prior Art

The conventional business-use video game machines involve so-called a bodily-sensation game machine already placed in practical use, which is adapted to cause vibration on a player's seat or tilt in the seat in order to enhance interest in a game further more.

Meanwhile, there is a controller, disclosed, e.g. in Japanese Utility Model Laying-Open No. S62-194389 laid open on Dec. 10, 1987, which has an electromagnet arranged within a joystick lever to cause vibration on the joystick lever due to the actuation of the electromagnet. It may be considered that such a game is available that vibration is transmitted to a player's hand by connecting a controller generative of vibration to a home-use video game machine.

In the prior art, however, there is no disclosure as to interrelations between the game images displayed on a display and vibration caused therefor. It is therefore difficult for such a prior art to utilize for a home-use video game system. Further, the above-mentioned bodily-sensation game machine is to generate vibration on the seat, and cannot be utilized for a home-use video game system without having such a seat.

SUMMARY OF THE INVENTION

Therefore, it is a primary object of this invention to provide a video game system which is capable of transmitting vibration to a player in a manner related to game images.

This invention is a video game system, having a video game machine and a controller, wherein the video game machine includes a processing means for generating game images displayed on a display depending upon an operating state of the controller and according to a game program memorized in the memory medium, the controller being used in a state of being gripped by a hand of a player, and comprising: a plurality of operating switches for designating a movement or motion of a player object; a vibration source for generating mechanical vibration; and a drive circuit for driving the vibration source in response to a command signal supplied from the video game machine; the memory medium comprising: a player object image generating program for generating an image of the player object that is varied in response to operation of at least one of the operating switches; an other object image generating program for generating an image of at least one other object that is present around the player object; a vibration generating condition detecting program for detecting a vibration generating condition based on a display state of the player object image and the other object image; and a vibration control program for generating data to control the vibration source in response to detection of the vibration generating condition according to the vibration generating condition detecting program; and the processing means generating the game images according to the player object image generating program and the other object image generating program, and causing through the drive circuit the vibration source to generate, according to the vibration control program, mechanical vibration at timing synchronous with generation of frames on the display.

This invention is a video game system, having a video game machine and a controller for supplying an operating signal thereto, wherein the controller is used in a state of being gripped by a hand of a player, and comprises a plurality of operating switches for designating a movement or motion of a player object, a vibration source for generating mechanical vibration, and a drive circuit for driving the vibration source in response to a command signal supplied from the video game machine, the video machine, comprising: a player object image generating means for generating an image of the player object that is varied in response to operation of at least one of the operating switches; a vibration generating condition detecting means for detecting a vibration generating condition based on an operating state of the operating switches of the controller; and a vibration generating means for causing through the drive circuit the vibration source to generate mechanical vibration at timing synchronous with generation of frames on a display, in response to detection of the vibration generating condition by the vibration generating condition detecting means.

The vibration generating condition is detected depending upon a state of the player object image and other object images (e.g. whether they are in hitting or the like). If this condition is detected, the vibration source included in the controller is driven by the drive circuit.

Also, it is possible to generate vibration depending upon a state of the operating switches of the controller, regardless of a state of the player object and the other objects.

According to this invention, vibration can be generated by the vibration source of the controller depending upon a state of game images. Accordingly, game play is possible with further realism.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
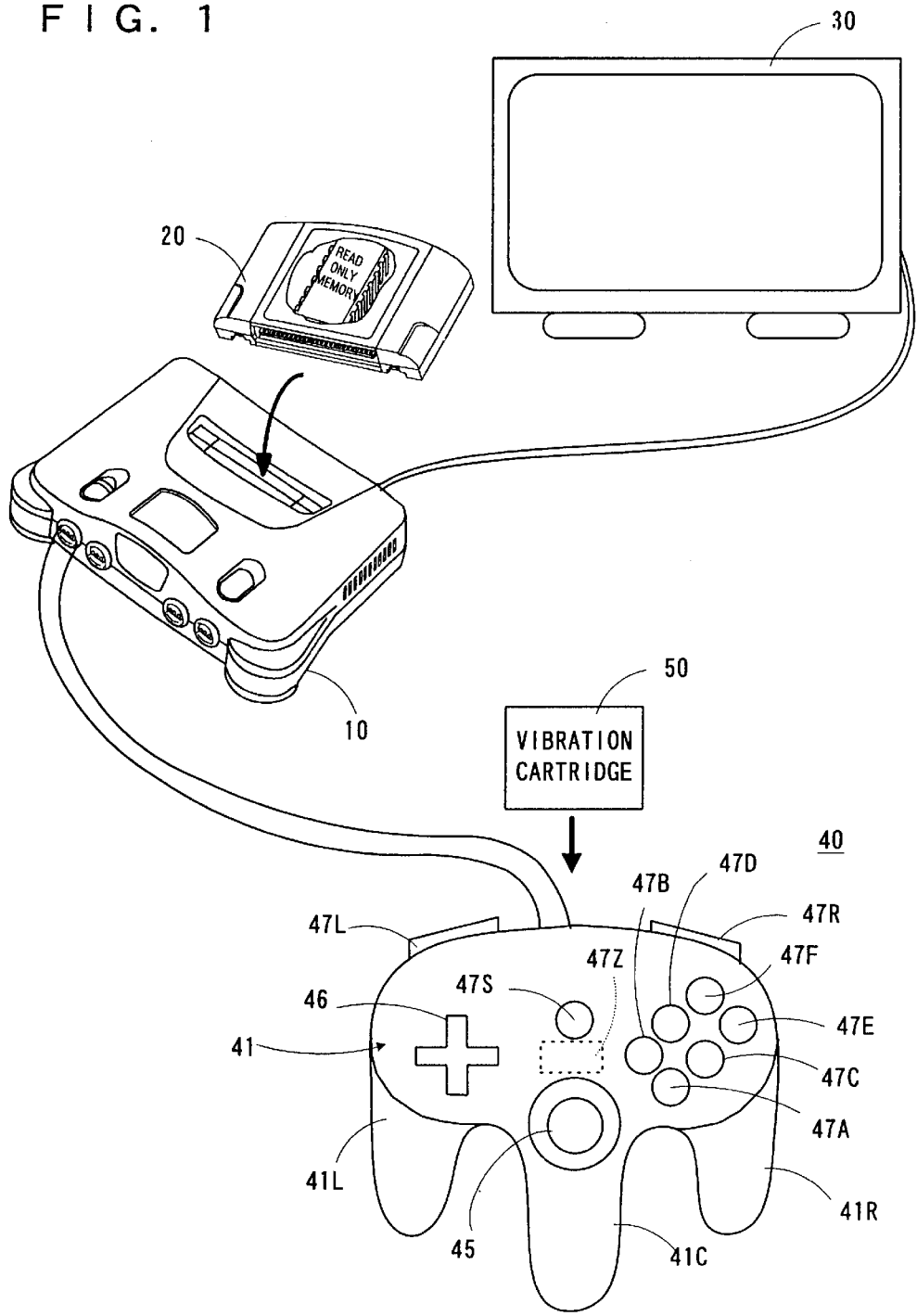
FIG. 1 is a schematic illustrative view showing a video game system according to one embodiment of this invention.

Referring to FIG. 1, a video game system in this embodiment includes a video game machine 10, a ROM cartridge 20 as one example of a memory medium, a display 30 connected to the video game machine 10, and a controller 40. The controller 40 is detachably mounted with a vibration cartridge 50.

The controller 40 is structured by a plurality of switches or buttons provided on the housing 41 formed graspable by both or one hand. Specifically, the controller 40 includes handles 41L 41C, 41R downwardly extending respectively from a left end, a right end and a center of the housing 41, providing an operating area in an upper surface of the housing 41. In the operating area, there are provided an analog-inputtable joystick (hereinafter referred to as "analog joystick") 45 at a central lower portion thereof, a cross-shaped digital direction switch (hereinafter called "cross switch") 46 on the left side, and a plurality of button switches 47A, 47B, 47D, 47E and 47F on the right side.

The analog joystick 45 is used to input a moving direction and/or moving speed or moving amount of a player object (an object operable by a player through the controller 40) determined by the amount and direction of inclination of the joystick. The cross switch 46 is used to designate a moving direction of the player object, in place of the joystick 45. The button switches 47A and 47B are used to designate a motion of the player object. Button switches 47C–47D are used to switch over a visual point of a three-dimensional image camera or adjust speed or the like of the player object. A start switch 47S is provided nearly at a center of the operating area. This start switch 47S is operated when starting a game. A switch 47Z is provided at a backside of the central handle 41C. This switch 47Z is utilized, for example, as a trigger switch in a shoot game. Switches 47L and 47R are provided on a side surface at upper left and right of the housing 41.

Incidentally, the above-stated button switches 47C–47F can also be used to control the moving speed (e.g. acceleration or deceleration) of the player object in a shoot or action game, besides for the purpose of switching the camera visual point. However, these switches 47A–47F, 47S, 47Z, 47L and 47R can be arbitrarily defined in their function depending upon a game program.

Figure 2:
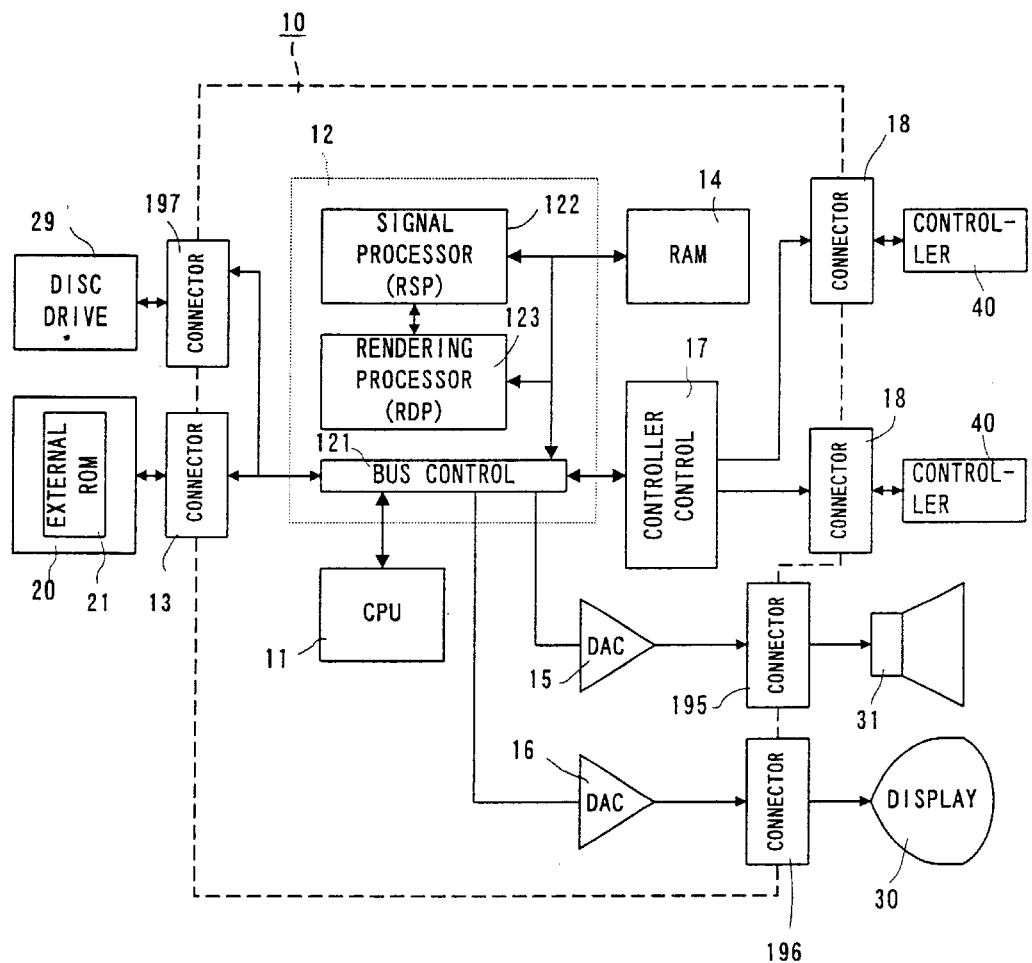
FIG. 2 is a block diagram showing in detail the video game machine in FIG. 1.

FIG. 2 is a block diagram of the video game system of the FIG. 1 embodiment. The video game machine 10 incorporates therein a central processing unit (hereinafter referred to as "CPU") 11 and a coprocessor (reality coprocessor: hereinafter referred to as "RCP") 12. The RCP 12 includes a bus control circuit 121 for controlling buses, a signal processor (reality signal processor; hereinafter referred to as "RSP") 122 for performing polygon coordinate transformation, shading treatment and so on, and a rendering processor (reality display processor; hereinafter referred to as "RDP") 46 for rasterizing polygon data into an image to be displayed and converting the same into a data form (dot data) memorable on a frame memory.

The RCP 12 is connected to a cartridge connector 13 for unloadably loading a ROM cartridge 20 having an external ROM 21 incorporated therein, a disc-drive connector 197 for detachably mounting a disc drive 29, and a RAM 14. Also, the RCP 12 is connected with DAC (Digital/Analog Converters) 15 and 16 for respectively outputting a sound signal and video signal to be processed by the CPU 11. Further, the RCP 12 is connected with a controller control circuit 17 to serially transfer operating data on one or a plurality of controllers 40 and/or data of the vibration cartridge 50.

The bus control circuit 121 included in the RCP 12 performs parallel/serial conversion on a command supplied in a parallel signal from the CPU via a bus, to thereby supply a serial signal to the controller control circuit 18. Also, the bus control circuit 121 converts a serial signal inputted from the controller control circuit 17 into a parallel signal, giving an output to the CPU 11 via the bus. The data representative of an operating state (operating signal or operating data) read out of the controller 40A–40D is processed by the CPU 11, and temporarily stored within a RAM 14, and so on. In other words, the RAM 15 includes a storage site for temporarily memorizing the data to be processed by the CPU 11, so that it is utilized for smoothly reading and writing data through the bus control circuit 121.

The sound DAC 15 is connected with a connector 195 provided at a rear face of the video game machine 10. The image DAC 16 is connected with a connector 196 provided at the rear face of the video game machine 10. The connector 195 is connected with a speaker 31 of a display 30, while the connector 196 is connected with a display 30 such as a TV receiver or CRT.

The controller control circuit 17 is connected with a controller connector provided at the front face of the video game machine 10. The connector 18 is disconnectably connected by a controller 40 through a connecting jack. The connection of the controller 40 to the connector 18 places the controller in electrical connection to the video game machine 10, thereby enabling transmission/reception or transfer of data therebetween.

Figure 3:
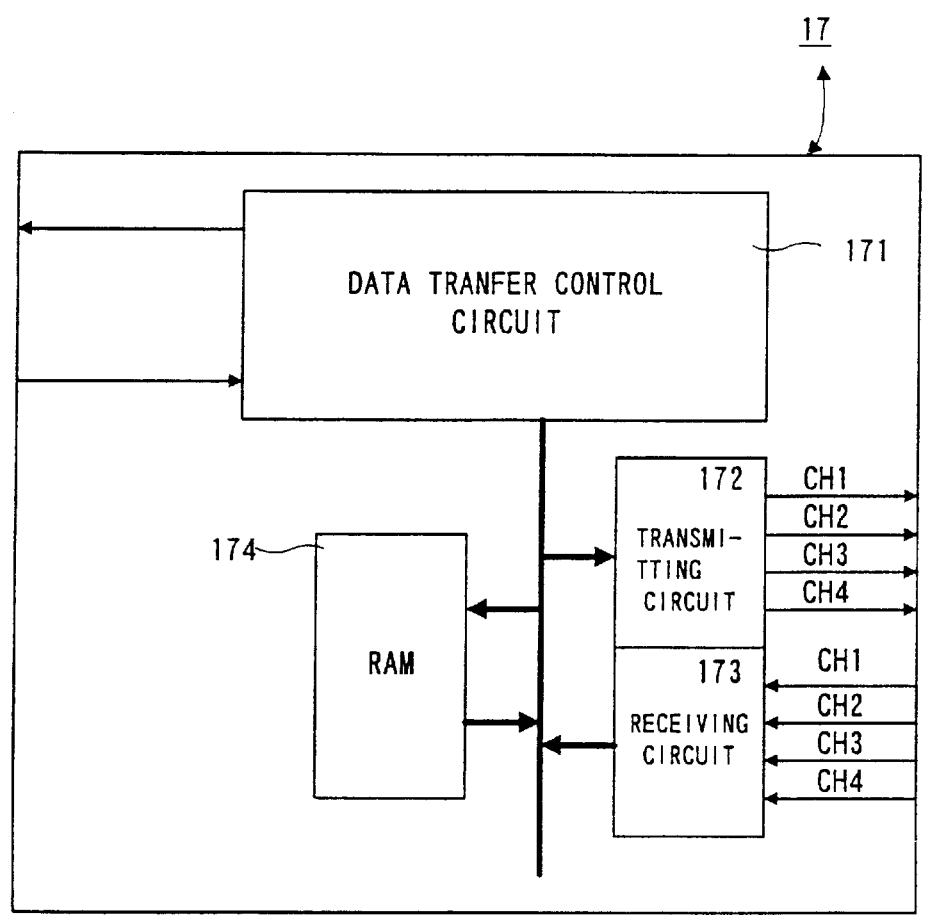
FIG. 3 is a block diagram showing in detail a controller control circuit in FIG. 2.

The controller control circuit 17 is used to transmit and receive data in serial between the RCP 12 and the connector 18. The controller control circuit 17 includes, as shown in FIG. 3, a data transfer control circuit 171, a transmitting circuit 172, a receiving circuit 173 and a RAM 174 for temporarily memorizing transmission and reception data. The data transfer control circuit 171 includes a parallel/serial converting circuit and a serial/parallel converting circuit in order to convert a data format during data transfer, and further performs write/read control on the RAM 174. The serial/parallel converting circuit converts the serial data supplied from the RCP 12 into parallel data, supplying it to the RAM 174 or the transmitting circuit 172. The parallel/serial converting circuit converts the parallel data supplied from the RAM 174 or the receiving circuit 173 into serial data, to supply it to the RCP 12. The transmitting circuit 172 converts the command for reading signals from the controller 40 and the writing data (parallel data) to the vibration cartridge 50, into serial data to be delivered to channels CH1–CH4 corresponding to the respective controllers 40.

The receiving circuit 173 receives, in serial data, operational state data of the controllers inputted through corresponding channels CH1–CH4 and data read from the vibration cartridge 50, to convert them into parallel data to be delivered to the data transfer control circuit 171. The data transfer control circuit 171 writes into the RAM 174 data transferred from the RCP 12, data of the controller received by the receiving circuit 183, or data read out of the RAM cartridge 50, and reads data out of the RAM 174 based on a command from the RCP 12 so as to transfer it to the RCP 12.

The RAM 174, though not shown, includes memory sites for the respective channels CH1–CH4. Each of the memory sites is stored with a command for the channel, transmitting data and/or reception data.

Figure 4:
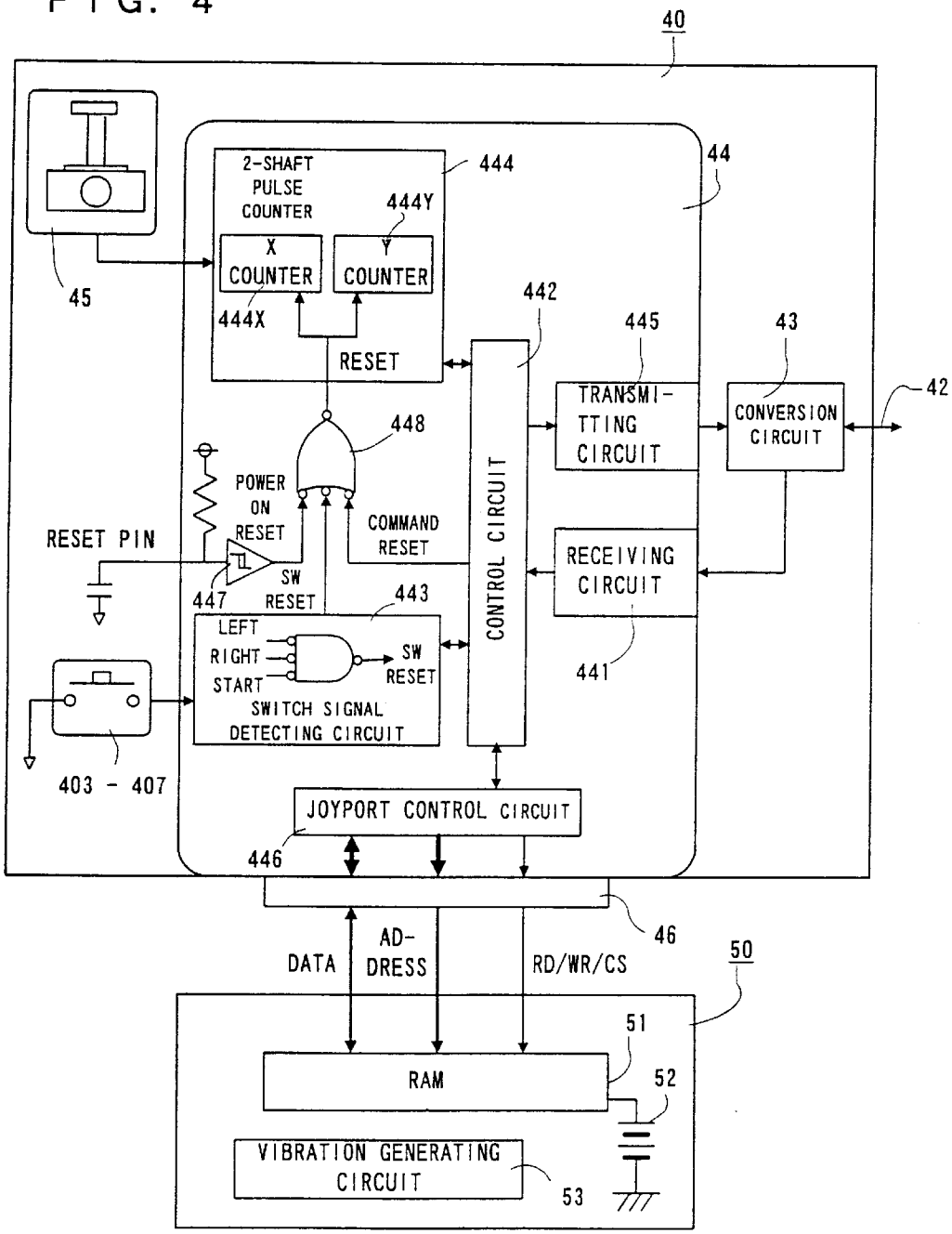
FIG. 4 is a block diagram showing in detail the controller control circuit and vibration cartridge in FIG. 2.

FIG. 4 is a detailed circuit diagram of the controller 40 and the vibration cartridge 50. The housing of the controller 40 incorporates an operating signal processing circuit 44, etc. in order to detect an operating state of the joystick 45, switches 46, 47, etc. and transfer the detected data to the controller control circuit 17. The operating signal processing circuit 44 includes a receiving circuit 441, a control circuit 442, a switch signal detecting circuit 443, a counter circuit 444, a joyport control circuit 446, a reset circuit 447 and a NOR gate 448. The receiving circuit 441 converts a serial signal, such as a control signal transmitted from the controller control circuit 17 or writing data to the vibration cartridge 50, into a parallel signal to supply it to the control circuit 442. The control circuit 442 generates a reset signal to reset (0), through the NOR gate 448, count values of an X-axis counter 444X and a Y-axis counter 444Y within the counter 444, when the control signal transmitted from the controller control circuit 17 is a signal for resetting X, Y coordinates of the joystick 45.

The joystick 45 includes X-axis and Y-axis photo-interrupters in order to decompose a lever inclination into X-axis and Y-axis components, generating pulses in number proportional to the inclination. The pulse signals are respectively supplied to the counter 444X and the counter 444Y. The counter 444X counts a number of pulses generated in response to an inclination amount when the joystick 45 is inclined in the X-axis direction. The counter 444Y counts a number of pulses generated responsive to an inclination amount when the joystick 45 is inclined in the Y-axis direction. Accordingly, the resultant X-axis and Y-axis vector-determined by the count values of the counters 444X and 444Y serves to determine a moving direction and a coordinate position of the player object or hero character or cursor. Incidentally, the counter 444X and the 444Y are reset, when a reset signal is supplied from the reset signal generating circuit 447 upon turning on the power or a reset signal is supplied from the switch signal detecting circuit 443 by simultaneous depression of predetermined two switches.

The switch signal detecting circuit 443 responds to a switch-state output command supplied at an interval of a constant period (e.g. a 1/30 second interval as a TV frame period) from the control circuit 442, to read a signal varying depending upon a depression state of the cross switch 46 and the switches 47A–47Z. The read signal is delivered to the control circuit 442. The control circuit 442 responds to a read-out command signal of operational state data from the controller control circuit 17 to supply in a predetermined data format the operational state data on the switches 47A–47Z and count values of the counters 444X and 444Y to the transmitting circuit 445. The transmitting circuit 445 converts the parallel signal outputted from the control circuit 442 into a serial signal, and transfer it to the controller control circuit 17 via a converting circuit 43 and a signal line 42. The control circuit 442 is connected with a joystick control circuit 446 via an address bus and a data bus as well as a port connector 46. The joyport control circuit 446 performs data input/output (or transmission/reception) control according to a command from the CPU 11 when the vibration cartridge 50 is connected to the port connector 46.

The vibration cartridge 50 is structured by connecting the RAM 51 to the address bus and data bus and connecting the RAM 51 with a battery 52. The RAM 51 is a RAM having a capacity (e.g. 256 k bits), for example, of lower than a half of a maximum memory capacity accessible through the address bus. The RAM 51 is to store backup data in relation to a game, and keeps backup data by the application of electric power from the battery 52 even if the vibration cartridge 50 is withdrawn from the port connector 449. This vibration cartridge 50 incorporates a vibration generating circuit 53 therein.

Figure 5:
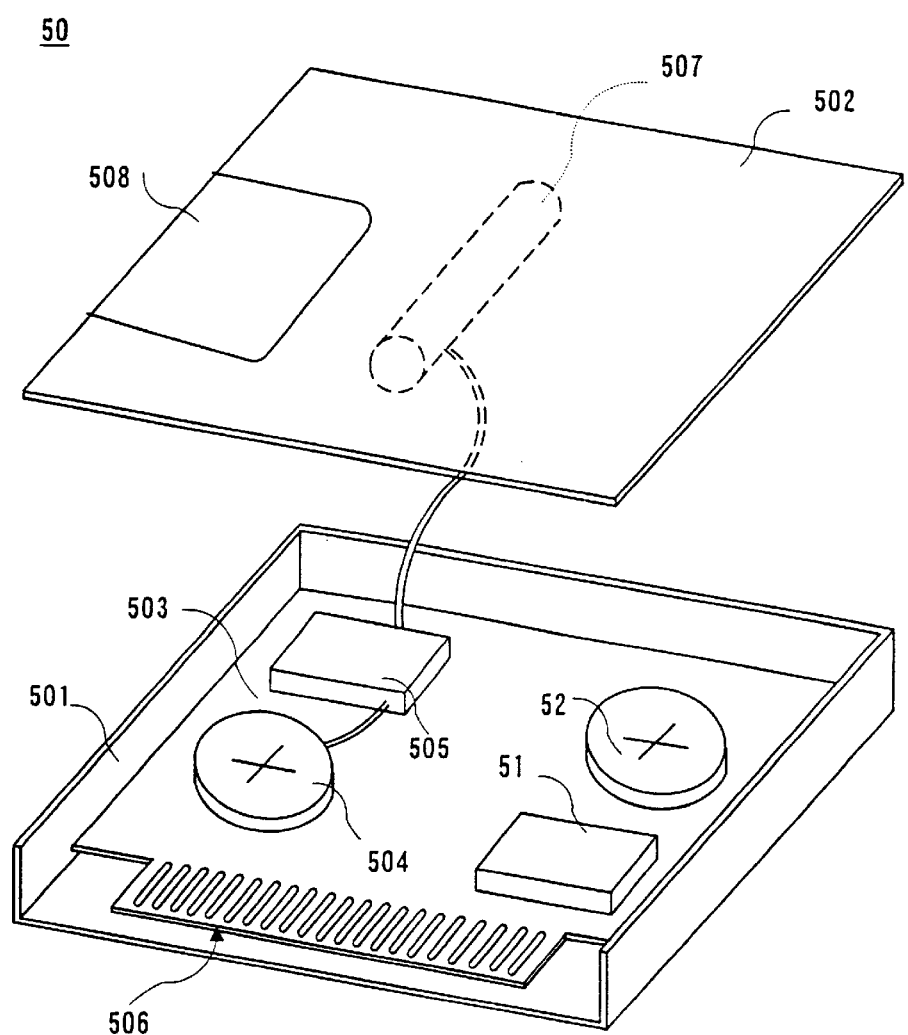
FIG. 5 is an illustrative view showing in detail the vibration cartridge.

Now the vibration cartridge will be explained in detail with reference to FIG. 5. The vibration cartridge 50 includes a case 501 and a back lid 502 attached to the case 501. The vibration cartridge 50, formed by this case 501 and the back lid 502, is dismountably mounted in an opening portion of the controller 40 shown in FIG. 1.

The case 501 has a substrate 503 accommodated therein. On the substrate 503 are mounted, besides the aforementioned RAM 51 and a backup battery 52, a battery 504 and a driving circuit 505 that constitute the vibration generating circuit 53 of FIG. 4. Incidentally, the substrate 503 has a plurality of terminals 506 at an edge portion toward this so that the terminals 506 are to be connected to a connector (not shown) formed at an opening portion of the above-stated controller 40. Through these terminals 506 are received data and addresses supplied from the CPU 11 (FIG. 2), that is, the controller control circuit 17 of the video game machine 10.

The back lid 502 is fixed with a vibration source 507 constituting the vibration generating circuit 53. In this embodiment, the vibration source 507 employs a motor to generate vibrations. However, it is of course possible to utilize, besides a motor, other devices, such as a solenoid, for generating vibration by the application of power. Incidentally, "FM16", "FM23", "FM25", "FM29" or "CM-5", etc. made by Tokyo Parts Industry Co., Ltd. are available as a vibration generating motor. Where using an "FM" motor, an eccentric member is attached to a rotary shaft built in a cylindrical case. When the rotary shaft is rotated, the eccentric member is rotated to cause vibration on the case. When a "CM" motor is used, an armature coil is eccentrically arranged. By rotating the armature, vibration is caused. Incidentally, if a solenoid is used, vibration occurs due to reciprocal movement of a magnetic core provided within the solenoid.

In any of the cases, the vibration source 507 structured as above is applied by power from the battery 504 and driven by the driving circuit 505, thereby causing vibration. The power consumed by the oscillation source 507 is comparatively great. Accordingly, in this embodiment the battery 504 was provided separately from the backup battery 52 (FIG. 4). Due to this, when the battery 504 is consumed, a battery lid removably fitted to the back lid 502 can be opened to allow the battery 504 to be exchanged with a new one. Note that the two batteries 52 and 504 may be a same one for common use.

Also, a power line may be included in a controller cable (not shown) so that power is supplied through the power line from the image processing apparatus main body or video game machine 10 via the terminals 506 to the vibration source 507. In such a case, it is needles to say that the capacity of the power line be appropriately determined in consideration of power required for the vibration source 507.

Further, in this embodiment, the vibration source 507 was mounted on the back lid 502 so that the vibration caused by the vibration source 507 is readily delivered to a player's hand, without attenuation. That is, the vibration caused by the vibration source 507 is transmitted through the back lid 502 to the opening portion of the controller 40 in contact with the back lid 502, thus vibrating the controller 40 itself. As a result, the vibration caused by the vibration source 507 is transmitted to the player's hand gripping the controller 40. It is therefore possible to provide the vibration source 507 at an arbitrary position within the case 501, provided that the vibration by the vibration source 507 is transmitted through the controller 40 to the player's hand.

Incidentally, this embodiment provided the vibration source 507 in the controller by mounting the vibration cartridge 50 on the controller 40. However, the vibration generating circuit 53 (FIG. 4), i.e. the vibration source 507, driving circuit 505, battery 504, etc. may be built in the housing of the controller 40 without using a vibration cartridge 50.

Figure 6:
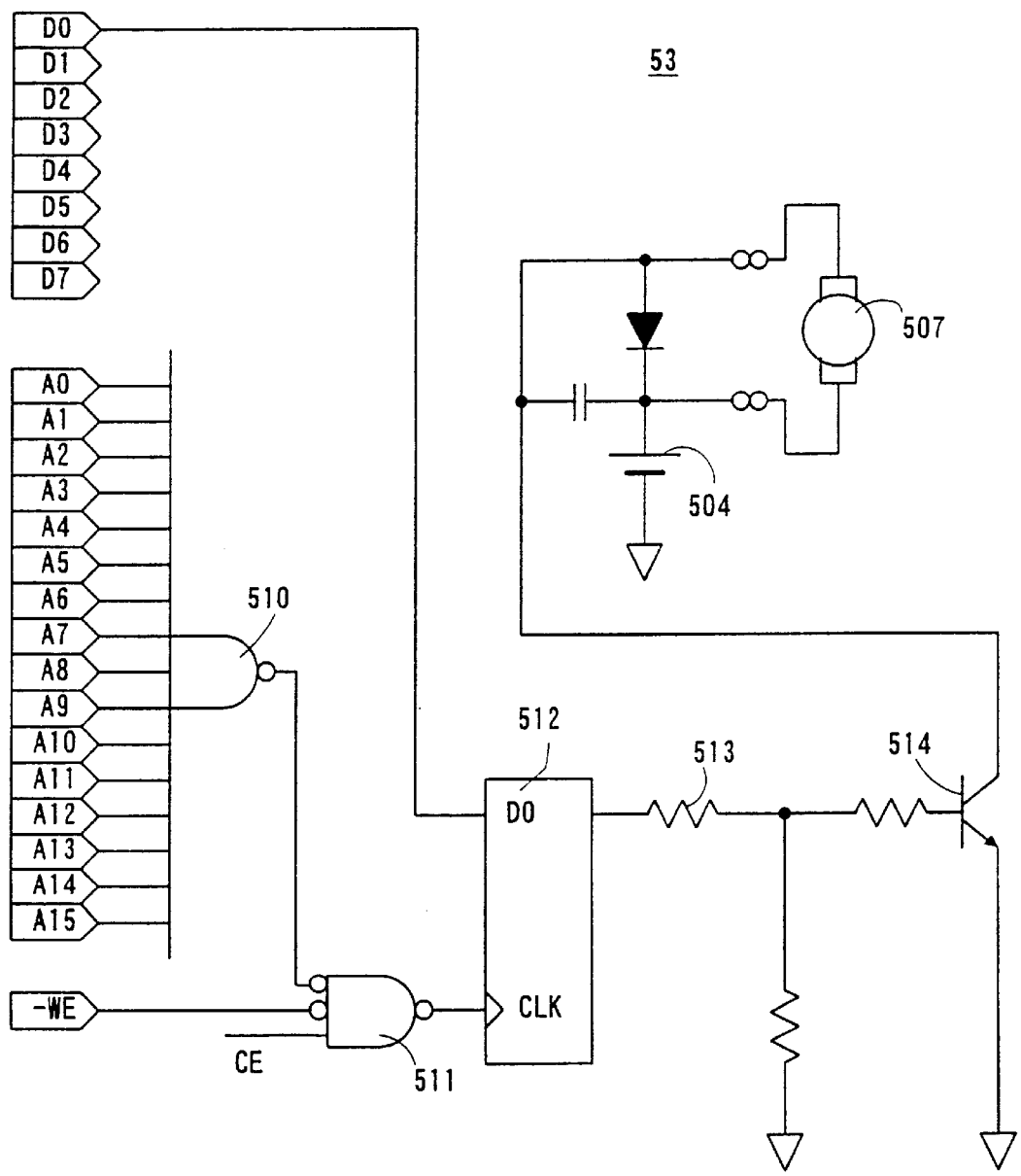
FIG. 6 is a circuit diagram showing a vibration generating circuit included in the vibration cartridge.

Now, the driving circuit 505 constituting the vibration generating circuit 53 will be explained in detail with reference to FIG. 6. The driving circuit 505 includes a decoder comprising a NAND gate 510. This NAND gate 510 receives address data A2–A14 through an address bus, i.e. the terminals 506 (FIG. 5) from the CPU 11 (FIG. 2) of the video game machine 10. In the game machine system of this embodiment, when all the addresses A0–A15 are "1", that is, when the CPU 11 designates an address range FFFF, a vibration mode is established to output data from the CPU 11 to drive a vibration source 507. That is, if the CPU address FFFF is designated, the output of the decoder, i.e. NAND gate 510, becomes "0". This output of the NAND gate 510 is supplied to a NAND gate 511. Since the NAND gate 511 is further supplied with a write signal-WE and a chip enable signal CE from the CPU 11, the NAND gate 511 responds to the output of the NAND gate 510 and the signals-WE and CE, to supply a latch signal to a latch 512. Consequently, when the CPU 11 designates the FFFF address, i.e. in the vibration mode, the latch 512 latches CPU data DO through the data bus or terminals 506. This CPU data D0 is outputted as "1" when vibration is to be caused by the vibration source 507, and "0" when no vibration is to be generated. The latch 512 has an output connected to a base of a drive transistor 514 through a resistor 513. When the output of the latch 512 is "1", the transistor 514 is turned on, whereas when the output is "0" the transistor is turned off. The turning-on of the transistor 514 causes a drive current to flow from the battery 504 to the vibration source 507 (vibration motor). Thus, vibration is generated by the drive source 507.

Figure 7:
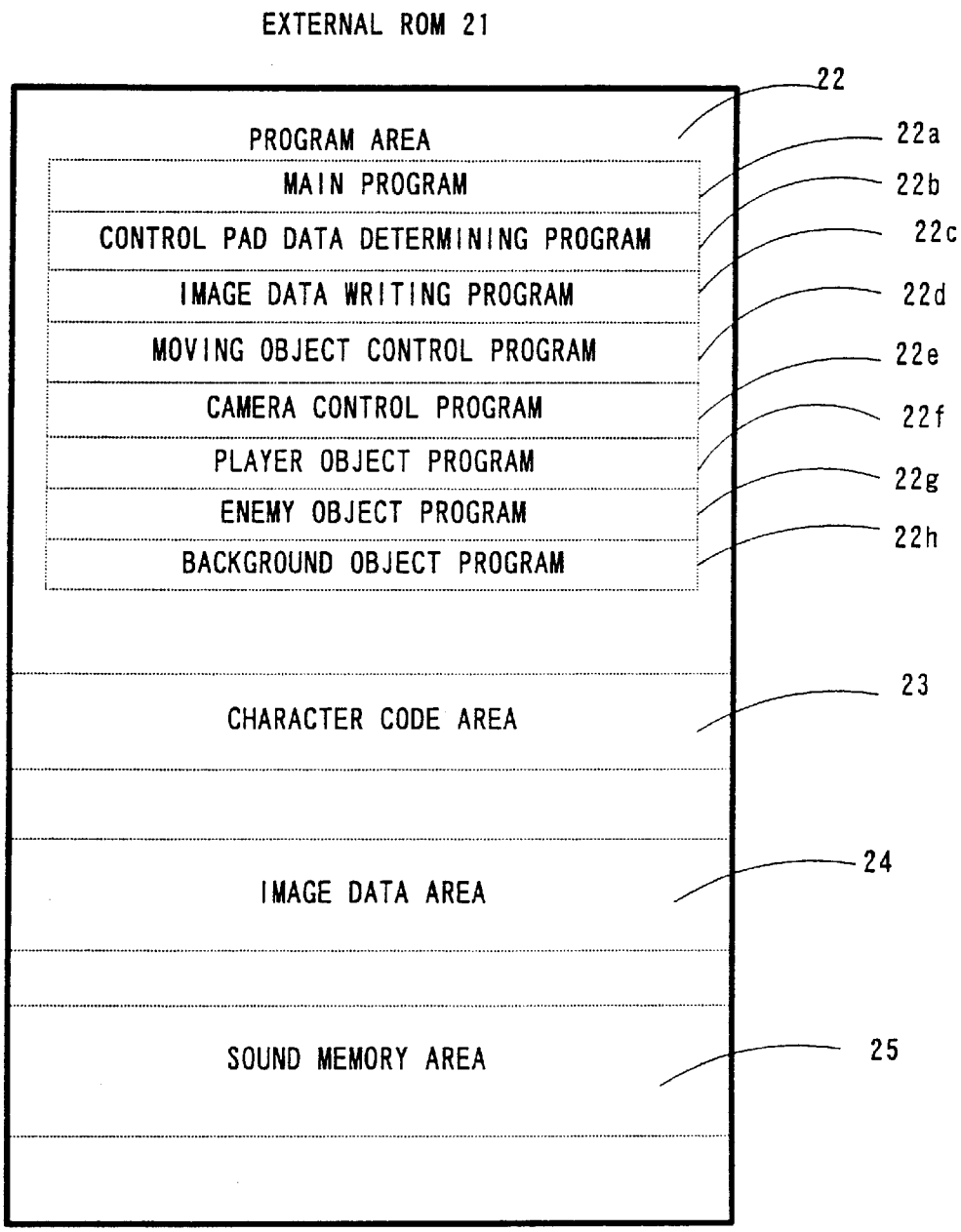
FIG. 7 is an illustrative view showing a memory map in an external ROM.

FIG. 7 is a memory map showing a memory space of the external ROM 21 incorporated in the ROM cartridge 20 (FIG. 1). The external ROM 21, for example, includes a plurality of memory areas (hereinafter referred to merely as "area") such as a program area 22, a character code area 23, an image data area 24 and a sound memory area 25, as shown in FIG. 5, thereby previously storing various program in a fixed manner.

The program area 22 is stored with programs required to process for game images, and game data and the like in accordance with a game content. Specifically, the program area 22 includes memory areas 12a–22h to previously store operating programs for the CPU 11 in a fixed manner. A main program area 22a is stored with a main routine processing program, for example, for a game shown in FIG. 9 stated later. A control pad data determining program area 22b is stored with a program for processing operational data on the controller 40. A write program area 22c is stored with a write program by which the CPU 11 causes the RCP 12 to perform writing into a frame memory and Z buffer. For example, the write program area 22c is stored with a program to write, into an image data area 201 (FIG. 8) of the RAM 14, chrominance data as image data based on texture data for a plurality of movable objects or background objects to be displayed in one background scene. A move program area 22d is stored with a control program by which the CPU 11 causes the RCP 12 to vary the position of a moving body in a three-dimensional space. A camera control program area 22e is stored with a camera control program that controls as to in which direction and/or position the movable objects including player object or the background objects are to be photographed in the three-dimensional space. A player object program area 22f is stored with a program that controls display of an object operated by the player. An enemy object program area 22g is stored with a program that controls display of an enemy object to make attacking on the player object. A background program area 22h is stored with a background creating program by which the CPU causes the RCP 12 to create a three-dimensional background scene.

The character code area 23 is an area to store a plurality of kinds of character codes, e.g. a plurality of kinds of character dot data corresponding to codes. The character code data stored in the character code area 23 is utilized to display an instructing text to the player in the process of a game.

An image data area 24 is stored with image data, such as coordinate data of a plurality of polygons for each of the background object and/or movable objects, and texture data, and also a display control program to display these objects stationary at a predetermined position or in a moving state.

A sound memory area 25 is stored with sound data, such as phrases for outputting in sound the above message, effect sounds, game musics, etc., in a manner appropriate for a scene.

Incidentally, the memory medium or external memory device may use various kinds of memory mediums, such as CD-ROMs or magnetic discs, in place of or in addition to the ROM cartridge 20. In such a case, a disc drive 29 (FIG. 2) is provided in order to read or write, if required, various data (including program data and data for image presentation) for a game from or onto an optical or magnetical disc memory medium such as a CD-ROM or magnetic disc. The disc drive 29 reads data out of a magnetic disc or optical disc magnetically or optically memorizing program data similarly to the external ROM 21, and transfer the same data to the RAM 14.

Figure 8:
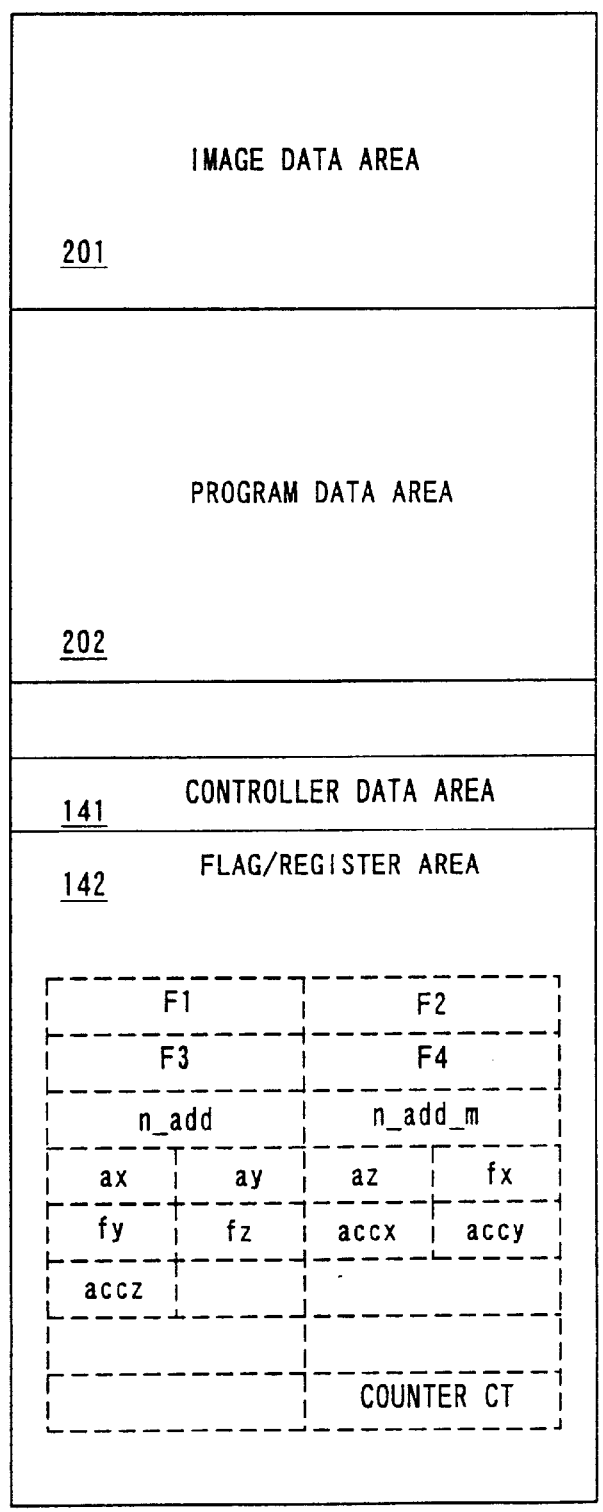
FIG. 8 is an illustrative view showing a memory map in a RAM.

FIG. 8 is a memory map showing a memory space of the RAM 14. The RAM 14 includes an image data area 201 and a program area 202. The image data area 201 includes, though not shown, a frame memory area for temporarily storing 1 frame of image data and a Z buffer area for storing the depth data on a dot basis in the frame memory area. The program data area 202 is an area for temporarily storing a program. The program data, allocated to the area (FIG. 7) of the ROM 21, is temporarily memorized, as required, on the program data area 202 so that the CPU 11 and the RCP 12

(FIG. 2) can proceed with a game by accessing to the program area of the RAM 14. Similarly, the image data area 201 is an area for temporarily memorizing, as required, the image data stored in the ROM 21, which can be directly accessed by the CPU 11 or the RCP 12. That is, the image data area 201 memorizes coordinate data and texture data of a plurality of polygons constituting stationary objects and/or movable objects stored, for game image display, in the external ROM 21. Prior to image processing, one course or stages of data, for example, is transferred from the external ROM 21 to the image data area 201.

A controller data memorizing area 141 temporarily memorizes operating state data representative of an operating state read from the controller 40.

Also, a flag/register area 142 sets a flag as required or memorizes a variable or constant while the CPU 11 is executing a program. The flags that can be set in this flag/register area 143 includes a vibration game flag F1, a hit flag F2, a preceding-frame flag F3 and a vibration flag F4.

The vibration game flag F1 is to represent as to whether a game now being played includes a scene that vibration is to be generated by the vibration source 507 of the vibration cartridge 50. The vibration game flag F1 is set at "1" when such a scene exists, and "0" for a case other than that case. The hit flag F2 is set at "1" when two objects collide or contact due to a hit determining routine (FIG. 11) stated later, and "0" for a case other than that case. The preceding-frame F3 is to set whether the hit flag F2 is set to "1" at a frame previous by 1 frame on the display 30, that is, whether two objects came into collision or contact with each other at an immediately preceding frame. The preceding frame F3 is set at "1" when a hit determination is made at the immediately preceding frame, and "0" for a case other than that case. The vibration flag F4 is set at "1" when vibration is to be generated by the vibration source 507, and "0" for a case other than that case.

A variable n_add is an increment value for each frame, to increase a count value n of a counter CT in a vibration generating condition detecting routine (FIG. 10) stated after, while a variable n_add_m is a value varied by the increment value n_add. The counter CT has a data size of 32 bits, so that it drives vibration source 507 (FIG. 5) to generate vibration when its count value n exceeds "255" as in a 256 (8-bit binary) counter. Variables ax, ay and az are respectively acceleration components in directions of an X-axis, Y-axis and Z-axis of the player object. Variables fx, fy and fz are values respectively multiplied of the acceleration components ax, ay and az by constants accx, accy and accz.

Incidentally, the variables n_add and n_add_m may be a constant. In the embodiment, the variable n_add is set at "255" or "150". Meanwhile, the variable n_add m is set, for example, at "20" or "10".

Figure 9:
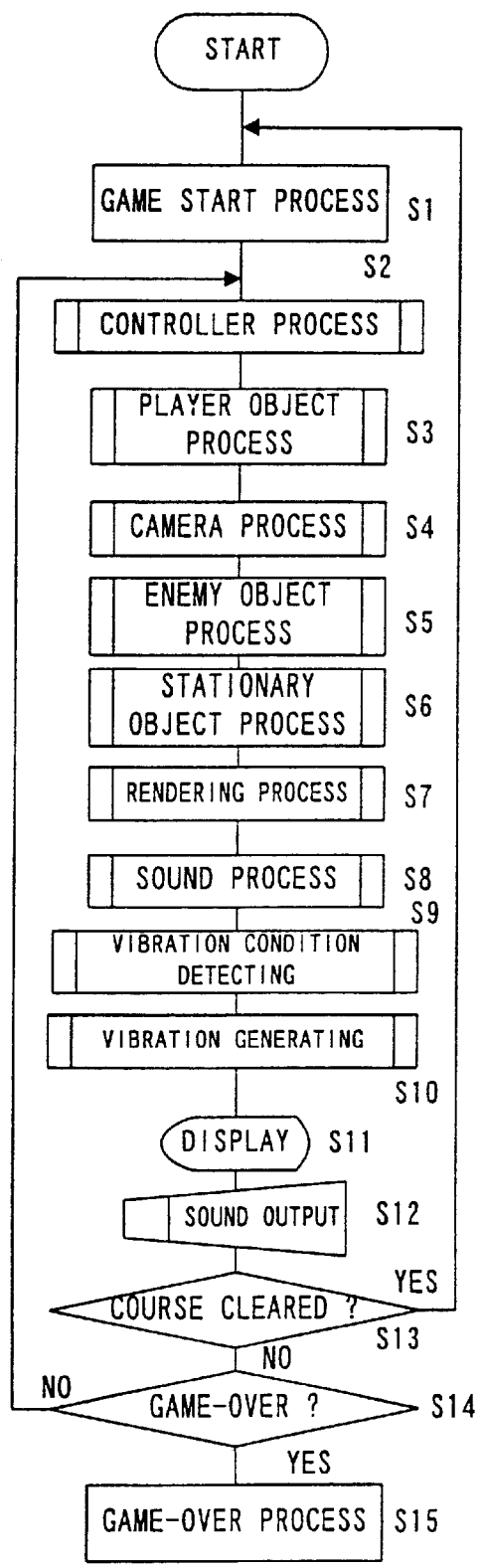
FIG. 9 is a flowchart showing an overall operation in the FIG. 1 embodiment.

FIG. 9 is a main flowchart for the video game system of this embodiment. If a power is turned on, the CPU, at a first step Si, sets the video game machine 10 into a predetermined initial state. For example, the CPU 11 transfers a start program, among the game programs stored in the program area 22 of the external ROM 21, to the program area 202 of the RAM 14, and sets each parameter at an initial value, thereafter sequentially executing steps of FIG. 9.

The operation of the main flowchart of FIG. 9 is executed, for example, every 1 frame (1/60 second) or every two or three frames, wherein steps S2–S14 are repeatedly executed before the course is cleared. If the game becomes over without success of course clear, a game-over process is effected at a step S15 following the step S14. If course clear is successfully done, the process returns from the step S13 to the step S1.

That is, at the step S1, display is made for a game course screen and/or course choosing screen. However, where a game is started after turning on a power, a first course screen is displayed. If the first course is cleared, a next course is set.

Following the step S1, a controller process is effected at a step S2. In this process, it is detected whether any of the joystick 45, the cross switch 46 and the switches 47A–47Z of the controller 40 is operated or not. Detected data (controller data) on this operating state is read in, and the controller data thus read is written into the controller data area 141 of the RAM 14.

At a step S3, a process for displaying the player object is performed. This process is basically to vary the position, direction, shape and location of the player object depending upon an operating state of the joystick 45 manipulated by the player and the presence or absence of attacks by an enemy. For example, polygon data to be varied is determined by calculation based on a program transferred from the memory area 22f (FIG. 7) of the external ROM 21, polygon data of the player object transferred from the memory area 24, and controller data, i.e. an operating state of the joystick 45. A plurality of polygons thus obtained are given colors due to a picture data.

At a step S4, a camera process is performed. For example, calculation is made for a visual point to the respective objects such that a visual line or field as viewed through a camera finder is in an angle at which the player designates by a joystick 45.

At a step S5, an enemy object process is performed. This process is effected based on the polygon data of an enemy object transferred from the memory area 22g and the memory area 24 (FIG. 2) and according to a program partly transferred. For example, an enemy object is determined in display position and/or shape by calculating the polygon data such that the enemy object moves to attack the player object or block against its advancing while judging movement of the player object, thereby displaying an enemy object image thus varied. Due to this, the enemy object will move such that it has a certain effect upon the player object.

At a step S6, a background (stationary) object process is performed. This process is to calculate a display position and shape of a stationary object based on a program partly transferred from the memory area 22h and polygon data of a stationary object transferred from the memory area 24 (FIG. 2).

At a step S7, the RSP 122 performs a rendering process. That is, the RCP 12 performs a conversion process (coordinate transformation process and frame memory rendering process), under control of the CPU 11, on image data for displaying a movable object and a stationary object based on the respective texture data for the movable object, such as an enemy object, the player object, etc. and the stationary object, such as a background, memorized in the image data area 201 of the RAM 14. Specifically, colors are put to a plurality of polygons for each of the movable objects and the stationary objects.

At a step S8, the CPU 11 performs a sound process based on sound data, such as of messages, musics, effect sounds, etc.

At a next step S9, the CPU 11 performs a vibration condition detecting process. That is, the RCP 12 at this step S9 executes a subroutine of FIG. 10, based on the image data of the player object and the enemy object or the stationary object or based on the operating data supplied from the controller 40, thereby detecting whether a condition under which vibration is to be generated by the vibration source 507 is established or not. Incidentally, a vibration condition detecting subroutine will be explained in detail later with reference to FIG. 10.

Figure 12:
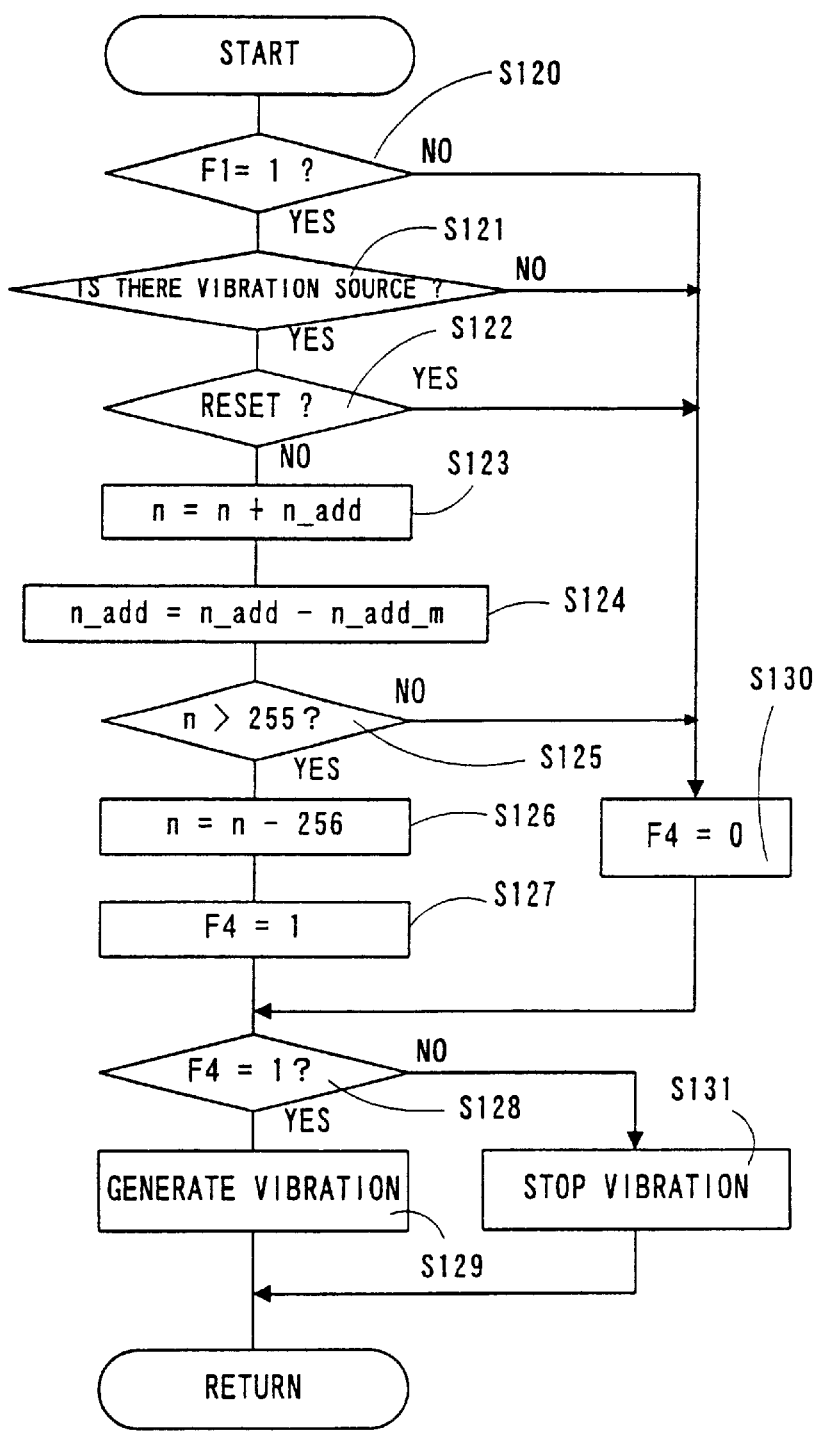
FIG. 12 is a flowchart showing a vibration generating subroutine.

At a next step S 10, the CPU 11 responds to a detection of a vibration generating condition by the step S9, to execute a subroutine shown in FIG. 12, thereby causing vibration by the vibration source 507. This step S10 will be also explained in detail with difference to FIG. 12.

At a step S1, the CPU 11 reads the image data memorized in the frame memory area of the RAM 14 as a result of the rendering process by the step S7. This causes the player object, the movable object, the stationary object, and the like to be displayed on a display screen of the display 30 (FIG. 1, FIG. 2).

At a step S12, the sound data that has been sound processed at the step S8 by the RCP 12 is read out to thereby output a sound, such as a music, effect sound conversation or the like.

It is determined at a step S13 whether the course is cleared or not (course clear detection). If the course is not cleared, it is then determined at a step S14 whether it is game-over or not. If it is not game-over, the process returns to the step S2, to repeat the steps S2–F14 until a condition of game-over is detected. If detecting a game-over condition that a number of mistakes permitted for a player reaches a predetermined number of times or the life of the player object is consumed by a predetermined amount, then a game-over process is carried out at a succeeding step S15 to choose game continuation, backup data saving, or the like.

Incidentally, if the condition to clear the course is detected (e.g. defeating a boss) at the step S13, the process returns to the step S1 after course-clear processing.

Figure 10:
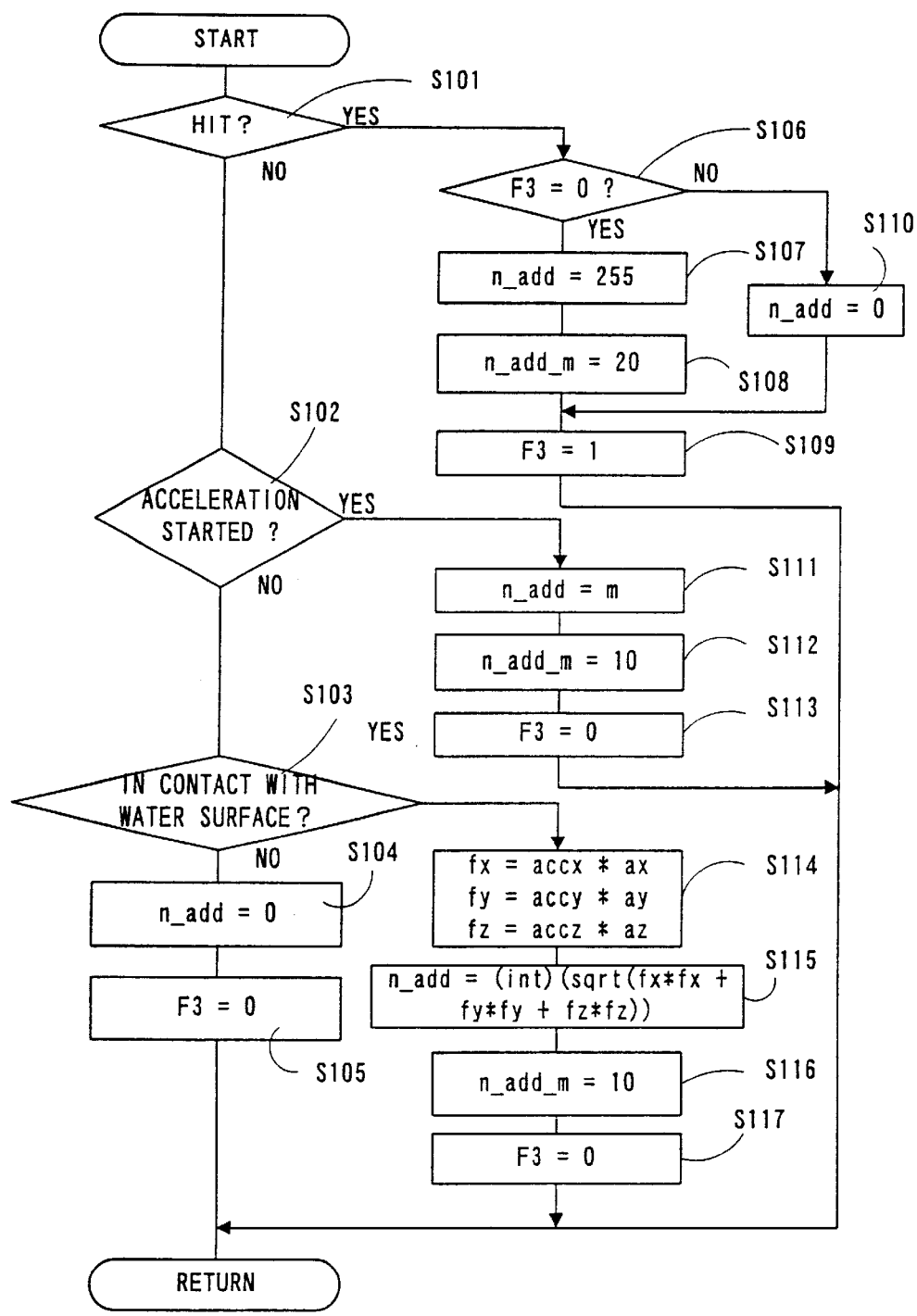
FIG. 10 is a flowchart showing a vibration generating condition detecting subroutine.

Referring to FIG. 10, at a first step S 101 of a vibration generating condition detecting subroutine, the CPU 11 determines whether or not the player object hits (collides or contacts) against an influencing object or obstacle (other movable objects, stationary objects such as ground, sea surface, wall, enemy objects, attacking objects, etc.). This hit detection is executed according to a subroutine of FIG. 11.

Figure 11:
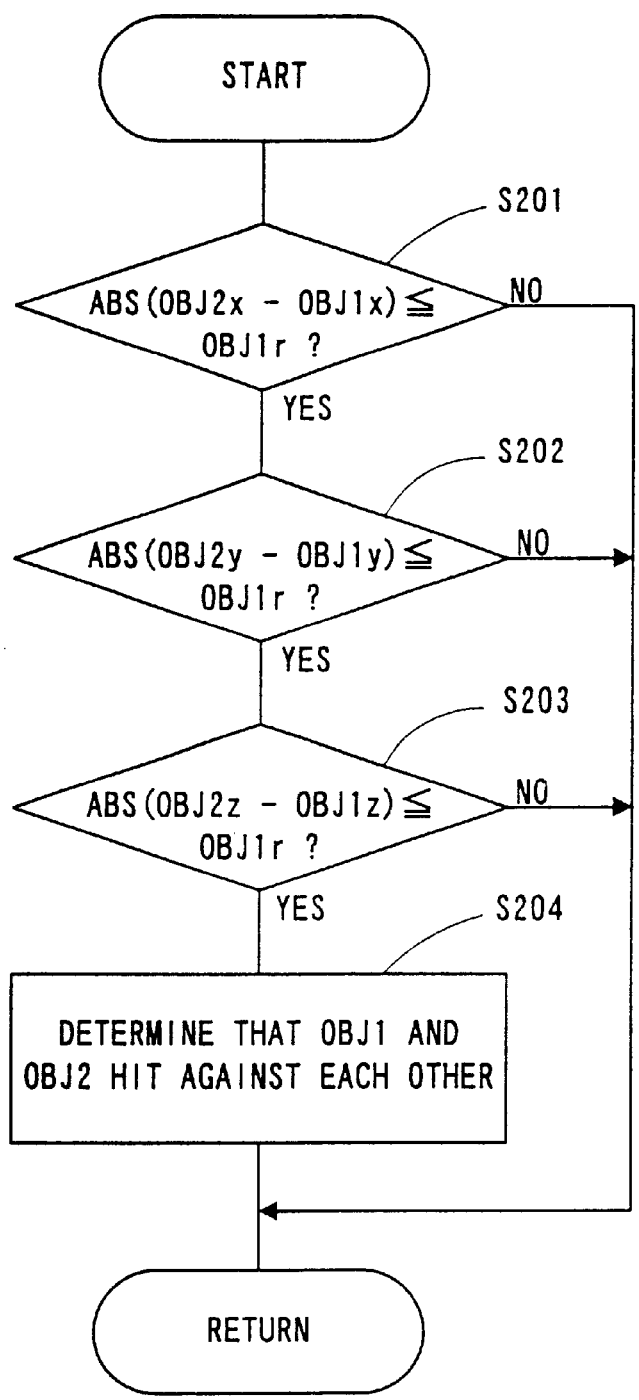
FIG. 11 is a flowchart showing a hit determining subroutine.

At a step S201 in FIG. 11, the CPU 11 determines whether ABS (OBJ2x–OBJ1x)≦OBJ1r is satisfied or not. That is, whether two objects are hit against each other on an X-coordinate system or not. OBJ1 is an object to be hit-determined, which in this embodiment is the player object. OBJ2 is an object moving toward OBJ1, which in this embodiment a fellow object, an enemy object, a stationary object and an attacking object launched by the enemy object. OBJ1x is an X-coordinate value of OBJ1, while OBJ2x is an X-coordinate value of OBJ2. OBJ1x and OBJ2x may be on a game space coordinate or player coordinate, provided that they are an X-coordinate value of a same coordinate system. ABS ( ) represents an absolute value of a numeral within ( ). OBJ1r is a value representative of a half length of a side of a cube when OBJ1 is considered as a cube. In other words, OBJ1r is a value indicating a hit range for OBJ1. If ABS (OBJ2x–OBJ1x)≦OBJ1r is satisfied, the process proceeds to a step S202.

At a step S202, the CPU 11 determines whether ABS (OBJ2y–OBJ1Y)≦OBJ1r is satisfied or not, that is, whether there is hit between two objects on a Y-coordinate system or not. OBJ1y is a Y-coordinate value of OBJ1, while OBJ2y is a Y-coordinate value of OBJ2. OBJ1y and OBJ2y may be on a game space coordinate or player coordinate, provided that they are in a Y-coordinate value on a same coordinate system. If ABS (OBJ2y–OBJ1y)≦OBJ1r is fulfilled, the process advances to a step S203.

At the step S203, the CPU 11 determines whether ABS (OBJ2z–OBJ1z)≦OBJ1r stands or not, that is, whether there is a hit between two objects on the Z coordinate system or not. OBJ1z is a Z-coordinate value of OBJ1, while OBJ2z is a Z-coordinate value of OBJ2. OBJ1z and OBJ2z may be on a game space coordinate or player coordinate, provided that they are in a Z-coordinate value on a same coordinate system. If ABS (OBJ2z–OBJ1z)≦OBJ1r is satisfied, the process proceeds to a step S204.

At the step S204, the CPU 11 determines that there is a hit between OBJ2 and OBJ1, and sets a hit flag F2 in the flag area 142 of the RAM 14 to "1".

On the other hand, if ABS (OBJ2x–OBJ1x)≦OBJ1r is not satisfied at the step S201, the process returns to a former routine. If ABS (OBJ2y–OBJ1y)≦OBJ1r is not profiled at the step S202, the process returns to the former routine. If ABS (OBJ2z–OBJ1z)≦OBJ1r is not satisfied at the step S203, the process returns to the former routine.

At the step S101 in FIG. 10, if it is detected that the player object is not hit by another object, that is, if "NO" is determined at the step S101, the CPU 11 at a next step S102 determines whether the player manipulates the controller 40 to start acceleration of the player object or not. For example, the acceleration start is effected by depressing an A button 47a (FIG. 1), where the player object is a "jet ski" in a "wave race". Also, if the player object is "Mario", the acceleration start is by inclining the joystick 45 (FIG. 1) frontward. Accordingly, the CPU 11 at this step S102 makes reference to the data in the controller data area 141 of the RAM 14, add determines whether there is an operation of the A button 47 A or joystick 45 or not.

At the step S102, if "NO" is determine, the CPU 11 at a next step S103 determines whether the player object ("jet ski" in the "wave race" in this embodiment) is in contact with a water surface or not. At the step S103, the hit detecting subroutine of FIG. 11 is utilized in order to determine whether the player object ("jet ski") is in contact with the water surface or not.

In the vibration generating condition detecting subroutine shown in FIG. 10, detection is made for any of the three vibration generating conditions, i.e. any of the steps S101, S102, and S103, as explained above. If "NO" is determined at any of the steps S101, S102 and S103, that is, if no vibration generating condition is detected, the CPU 11 resets, at a step S104 in FIG. 10, the register value n_add of the flag/register area 142 of the RAM 14 to "0". At the same time, the CPU 11 at next step S105 clears off the preceding frame flag F3 of the flag register area 142 to "0". That is, the count value n of the counter CT is added by "0" for each frame, in order to set the increment value n_add of the counter CT at "0". In other words, if "NO" is determined at all the steps S101, S102 and S103, the counter CT is not incremented at all. As will be stated later, if the count value of the counter CT exceeds, for example, "255", vibration will occur. Accordingly, in the above case no vibration is generated by the vibration source 507.

Incidentally, since "NO" is determined at the above-mentioned step S101, the preceding-frame flag F3 is reset at the step S105.

If "YES" is determined at any of the steps S101, S102 and S103, a vibration generating condition is established and a vibration generating process is effected according to the corresponding vibration generating condition.

That is, if it is determined, at the step S101, that the player object is hit against another object, steps S106 to S110 are executed to generate intense vibration from the vibration source 507. Meanwhile, an acceleration start is detected at the step S102, weak vibration is generated by steps S11 to S113. If the player object (e.g. "jet ski") is in contact with a water surface is detected at the step S103, steps S114 to S117 are executed to generate weak vibration representing a state that the "jet ski" moves bounding on waves.

If "YES" is determined at the above-mentioned step S101, that is, if the player object comes into collision or contact with another object is determined, the CPU 11 determines whether the preceding-frame flag F3 is at "0" or not. That is, at this step S106 it is determined whether the player object collided against another object also at the preceding frame or not. If at the step S106 "YES" is determined, that is, if it is determined there was no collision or contact of the player object at the preceding frame but there is detection at a current frame of collision or contact of the player object with another object, the CPU 11 at a next step S107 sets the increment value n_add of the flag/register area 142 of the RAM 14, for example, to "255" in order to generate intense vibration.

Figure 13:
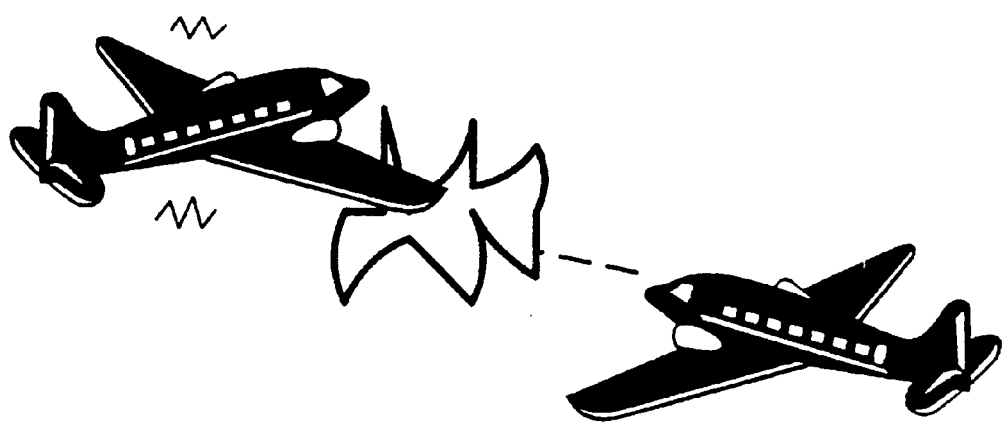
FIG. 13 is an illustrative view showing collision of a player object against an enemy object.
Figure 14:
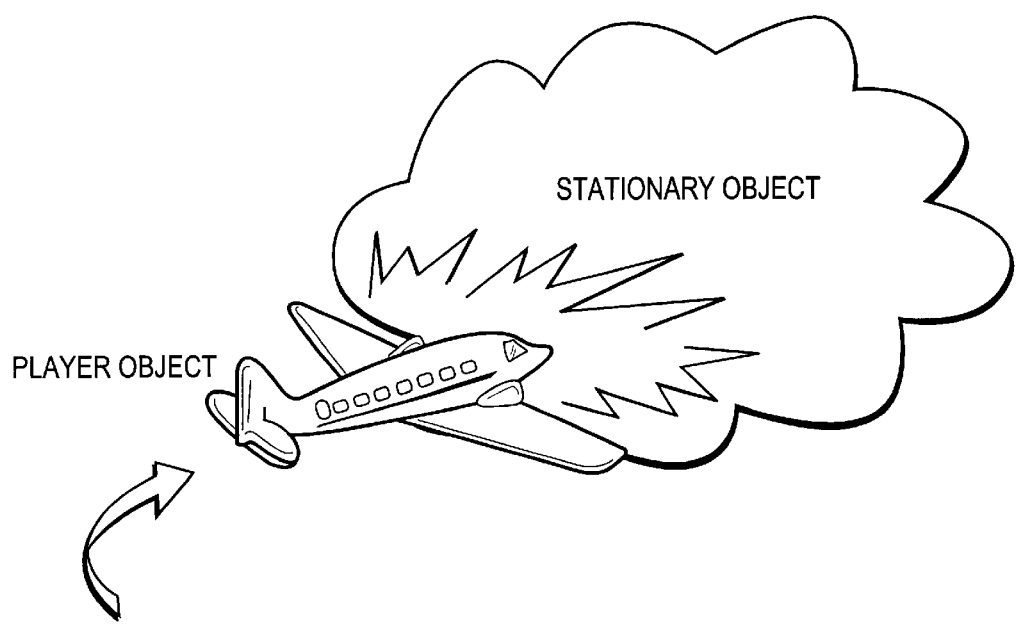
FIG. 14 is an illustrative view showing collision of the player object against a stationary object.

That is, where the player object comes into collision or contact with an enemy object as shown in FIG. 13, or where the player object crashes into or contacts an enemy object or stationary object as shown in FIG. 14, a greater increment value n_add is set at a step S107 in order to cause intense vibration.

Then the CPU 11 at a step S108 sets a variation value n_add_m of the increment value n_add at "20". When there is collision or contact with another object, the increment value n_add is set to "255" at the step S107 and the variation value n_add_m is set to "20" at the step S108 in order to generate intense vibration. If the variation value n_add_m is great in value, the increment value n_add becomes "0" in a brief time, while if the variation value n_add_m is small, it takes a long time for the increment value n_add to reach "0". Therefore, when the variation value n_add_m is great, the vibration due to the vibration source 107 continues for a long time. At a step S109 following the step S108, the CPU 11 sets the preceding-frame flag F3 to "1". That is, since at the current frame the player object is detected of hit, the previous frame flag F3 is set to "1" at this time point.

Incidentally, if "NO" is detected at the above-mentioned step S106, that is, if the preceding-frame flag F3 is "1", that is, if there is also a detection of collision or contact of the player object at the preceding frame, the increment value n_add is reset to "0" at a step S110. That is, when the player object comes into contact or collision with another object also at the preceding frame, the increment value n_add is rendered "0" at the step S110 in order to prevent vibration from continuously occurring.

At the step S102, if an acceleration start of the player object is detected, the CPU 11 sets the increment value n_add, for example, to "150" at a next step S111 to generate weak vibration. That is, when an acceleration of the player object is started, the increment value n_add of the counter CT is set to "150" smaller than the value of the step S107 in order to generate comparatively small vibration differently from the case of the above-stated hit detection. The CPU 11 then sets the variation value n_add_m to "10" at a step S112. At a step S113, the preceding-frame flag F3 is rendered "0". That is, this step S113 is a step to be executed when "NO" is determined at the above-mentioned step S101, and accordingly the preceding-frame flag F3 is rendered "0" in a manner different from that of the above step S109.

Further, if it is detected at the step S103 that the player object, i.e. "jet ski" in this embodiment, is in contact with a water surface, calculations are made for multiplying values fx, fy and fz at a next step S114. The CPU 11 at a step S115 calculates a square root (decimal fraction truncated) of "fx×fx+fy×fy+fz×fz" as an increment value n_add of the counter CT. That is, at these steps S114 and S115, acceleration components ax, ay and az of the player object in the respective X-axis direction, Y-axis direction and Z-axis direction are determined to determine values fx, fy and fz respectively proportional to the acceleration components. An increment value n_add in a range of "0"–"255" is calculated, depending upon these proportional values and multiplying values. At a step S116, the variation value n_add_m of the increment value n_add is set to, for example, "10". That is, where the player object "jet ski" is in contact with the water surface, the variation value n_add m is set at a relatively small value "10" in order to give impact for a comparatively long time. In also this case, since "NO" is determined at the above step S101, the preceding-frame flag F3 is rendered "0" at a succeeding step S117.

At a first step S120 in FIG. 12 showing a vibration generating subroutine, the CPU 11 determines whether the vibration game flag F1 in the flag/register area 142 of the RAM 14 is at "1" or not, that is, whether a game now being played is a game involving vibration or not. If "YES" is determined at this step S120, the CPU 11 makes reference to the controller data area 141 of the RAM 14, and determines whether a vibration cartridge 50 (FIG. 1, FIG. 4) is loaded on the controller 40 or not. If this game is a game with vibration and a vibration cartridge 50 is loaded on the controller 40, the CPU 11 determines at a next step S122 whether or not vibration has to be forcibly stopped despite a vibration generating condition is established, that is, whether vibration is reset or not.

If "NO" is determined at this step S122, the CPU 11 renders the count value n of the counter CT as "n+n_add" at a next step S123. That is, the count value n of the counter CT is increased according to an increment value n_add.

At a next step S124, the increment value n_add is modified according to a variation value n_add_m. That is, the increment value n_add is subtracted by the variation value n_add_, at this step S124, at every 1 frame of the display 30. Accordingly, the count value n of the counter CT has an increment value decreasing with progress of frames, and the count value n finally does not increase. In other words, the vibration due to the vibration source 507 is initially large (intense) and gradually decreases (weakens) to ultimate no vibration.

At a step S125, it is determined whether the count value n of the counter CT exceeds "255" or not. if "YES" is determined at this step S125, the count value of the counter CT is rendered "n−256". That is, if it is determined at the step S125 that the count value n of the counter CT exceeds "255", the count value n is subtracted by "256" at a next step S126. At a step S127, the CPU 11 sets the vibration flag F4 at "1". Since the count value n of the counter CT exceeds "255" is detected at the above step S125, the vibration flag F4 at this step S127 is set at "1".

At a next step S128, it is determined whether the vibration flag F4 is at "1" or not. Since vibration is generated by setting the vibration flag F4 at "1" at the above step S127, the CPU 11 at a next step S 129 outputs "1" to all the addresses A2–A14 except for an address A15, and outputs a write signal and a chip enable signal. Accordingly, at this step S129 a recorder or NAND gate 511 (FIG. 6) has an output signal, and the latch 512 latches data it D0 of the CPU 11. Since at the step S129 vibration has to be generated y the vibration source 507, the data it D0 of the CPU 11 is outputted as "1". Accordingly, "1"is latched by the latch 512 (FIG. 6). In response thereto, the transistor 514 is turned on to supply power from the battery 504 to the vibration source or vibrating motor 507, thereby causing vibration in the vibration source 107 or vibration cartridge 50, i.e. on the controller 40.

Incidentally, if "NO" is determined at the step S125, the vibration flag F4 is reset at "0" at a step S130. That is, when the count value n of the counter CT does not exceed "255", the vibration flag F4 is kept in a reset state.

At the step S127, when the vibration flag F4 is not at "1", that is, when the vibration flag F4 is at "0", the CPU 11 outputs "0" to the data it "D0" at a step S131, in order to stop the vibration. Consequently, "0" is latched by the latch 512, and the transistor 514 is turned off. Accordingly, the vibration source 507 has no current, and no vibration is generated by the vibration source 507.

For example, if the player object comes into collision or contact with an enemy object or stationary object (FIG. 13, FIG. 14), "255" is set as an increment value n add of the count value n of the counter CT at the step S107, and "20" is set as a variation value n_add_m at the step S108. The count value n of the counter CT exceeds "255" over consecutive 4 frames excepting the first frame as shown in Table 1 and FIG. 15. Therefore, the vibration source 507 is continuously driven over the consecutive 4 frames, and thereafter the count value n exceeds "255" every two frames. The vibration source 507 generates a comparatively intense vibration driven every two frames.

TABLE 1

INTENSE VIBRATION EXAMPLE

| FRAME | n | n_add | n_add_m | VIBRATION SIGNAL |
|---|---|---|---|---|
| 1 | 255 | 255 | 20 | 0 |
| 2 | 234 | 235 | 20 | 1 |
| 3 | 193 | 215 | 20 | 1 |
| 4 | 132 | 195 | 20 | 1 |
| 5 | 51 | 175 | 20 | 1 |
| 6 | 206 | 155 | 20 | 0 |
| 7 | 85 | 135 | 20 | 1 |
| 8 | 200 | 115 | 20 | 0 |
| 9 | 39 | 95 | 20 | 1 |
| 10 | 114 | 75 | 20 | 0 |
| 11 | 169 | 55 | 20 | 0 |
| 12 | 204 | 35 | 20 | 0 |
| 13 | 219 | 15 | 20 | 0 |
| 14 | 219 | 0 | 20 | 0 |
| 15 | 219 | 0 | 20 | 0 |
| 16 | 219 | 0 | 20 | 0 |
| 17 | 219 | 0 | 20 | 0 |
| 18 | 219 | 0 | 20 | 0 |
| 19 | 219 | 0 | 20 | 0 |
| 20 | 219 | 0 | 20 | 0 |

However, when starting an acceleration for the player object, comparatively weak vibration is generated. Accordingly, "150" is set as an increment value n_add at a step S111, and "10" is set as a variation value n_add_m at a step S112. Consequently, in this case the count value n exceeds "255" every two frames as shown in Table 2 (FIG. 16) so that the vibration source 507 is driven every two frames and the following 2 frames are suspended of vibration. At a next 1 frame the vibration source 507 is driven, and thereafter the vibration is suspended for 2 frames.

TABLE 2

WEAK VIBRATION EXAMPLE

| FRAME | n | n_add | n_add_m | VIBRATION SIGNAL |
|---|---|---|---|---|
| 1 | 150 | 150 | 10 | 0 |
| 2 | 34 | 140 | 10 | 1 |
| 3 | 164 | 130 | 10 | 0 |
| 4 | 28 | 120 | 10 | 1 |
| 5 | 138 | 110 | 10 | 0 |
| 6 | 238 | 100 | 10 | 0 |
| 7 | 72 | 90 | 10 | 1 |
| 8 | 152 | 80 | 10 | 0 |
| 9 | 222 | 70 | 10 | 0 |
| 10 | 26 | 60 | 10 | 1 |
| 11 | 76 | 50 | 10 | 0 |
| 12 | 116 | 40 | 10 | 0 |
| 13 | 146 | 30 | 10 | 0 |
| 14 | 166 | 20 | 10 | 0 |
| 15 | 176 | 10 | 10 | 0 |
| 16 | 176 | 0 | 10 | 0 |
| 17 | 176 | 0 | 10 | 0 |
| 18 | 176 | 0 | 10 | 0 |
| 19 | 176 | 0 | 10 | 0 |
| 20 | 176 | 0 | 10 | 0 |

That is, where generating intense vibration, the vibration source 507 is continuously driven over several frames and then the vibration is gradually decreased as if driven every 2 frames. When weak vibration is to be generated, the driving source 507 is driven every 2 frames and then the vibration is gradually decreased in a manner driven every 3 frames. However, it is needless to say that the increment value n_add or the variation value n_add_, that is, the vibration generating pattern as above, can be set in an arbitrary manner.

incidentally, under a third vibration generating condition, i.e. where the player object ("ski") is in contact with a water surface, the increment value n_add is set as a function of acceleration of the player object, generating intense or weak vibration depending upon the acceleration.

Figure 15:
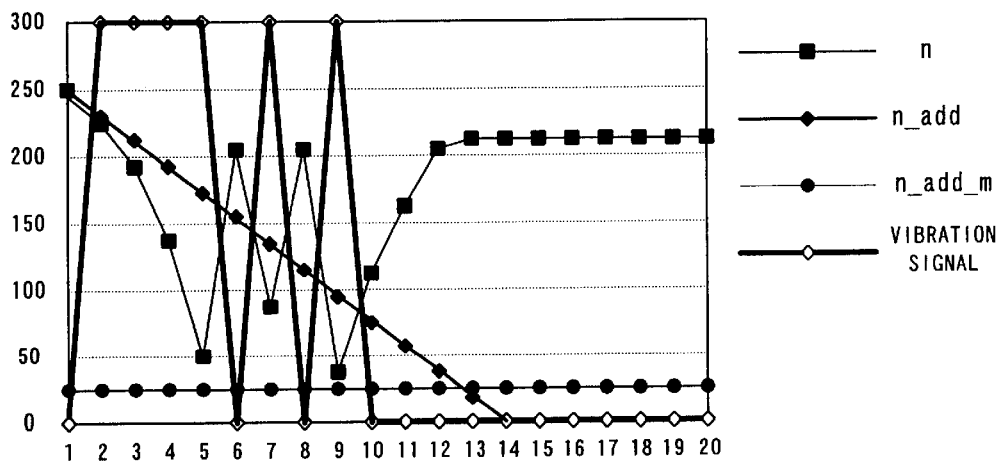
FIG. 15 is a graph showing a vibration pattern to generate intense and brief vibration.
Figure 16:
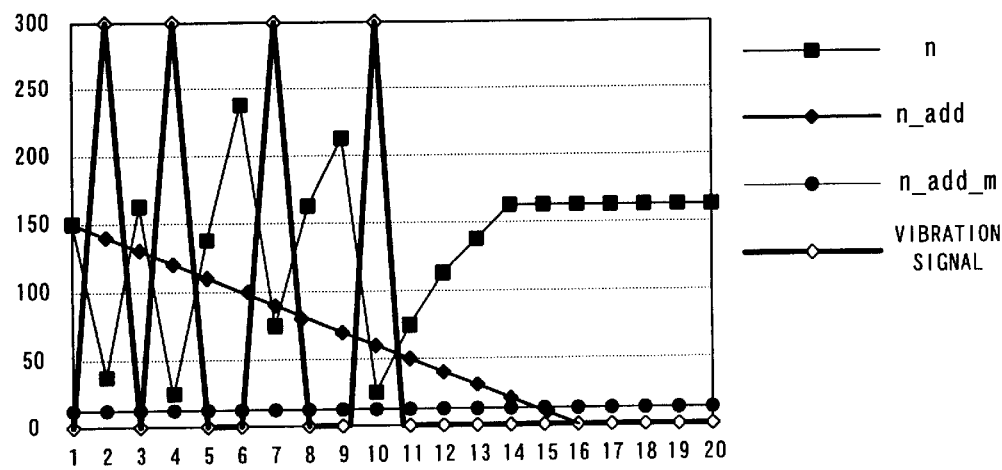
FIG. 16 is a graph showing a vibration pattern to generate weak and long vibration.

Incidentally, in the above embodiment the count value n of the counter CT is varied according to an increment value n_add or an variation value n_add _m, by executing the flowchart of FIG. 12, in order to generate intense or weak vibration as shown in FIG. 15 or FIG. 16. When the count value n exceeds "255", the vibration flag F4 is set to "1" to drive the vibration source 507 That is, in the above embodiment whether to generate vibration by the vibration source 507 is determined by calculation in a real time manner.

Figure 17:
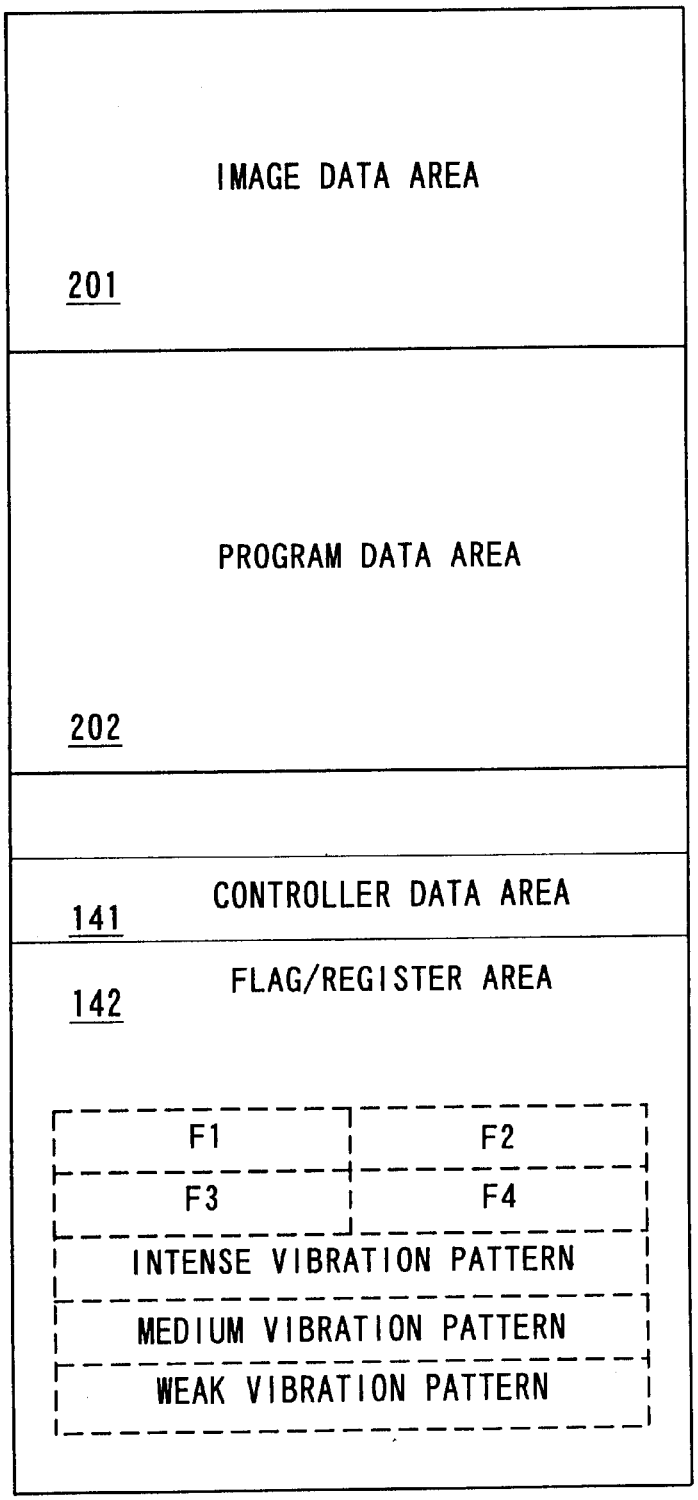
FIG. 17 is an illustrative view showing a memory map in the RAM of an embodiment in this invention.

Contrary to this, intense and weak vibration pattern data, read out of the program area 22a of the external ROM 21 may be respectively memorized on the flag/register area 142 of the RAM 14 as shown, for example, in FIG. 17. By selectively reading out these vibration pattern data, the vibration source 507 may be controlled based on these pattern data. It can be considered that the intense vibration pattern data uses a vibration signal "0111101010000000" in a frame sequence of frames 1–16 in the afore-said Table 1. Meanwhile, the weak vibration pattern data may use a vibration signal "0101001001000000" in a frame sequence of frames 1–16 in the afore-mentioned Table 2. Incidentally, medium vibration pattern data may be memorized as required.

For example, when the player object is detected of its collision or contact at the step S101 in FIG. 10, if intense vibration pattern data is read out, the vibration source 507 is not driven by a first frame. However, the vibration source 507 is continuously driven over the following 4 frames, and then at every 2 frames, thereafter being ceased of drive. For example, when an acceleration start is detected at the step S102 in FIG. 10 or a contact with a water surface is detected at the step S103 weak vibration pattern data is read out. Consequently, the vibration source 507 is driven at every 2 frames during the first 4 frames, and then driven at every 3 frames, thereafter being ceased of drive.

In the above embodiment, when the player object is hit by another object or the like, vibration is generated by the vibration source 507 of the vibration cartridge 50 loaded on the controller 40. Vibration may be visually given to game images in timing related to this vibration. In such a case, the game-image vibration on the display 30 can be perceived with higher rapidity than the mechanical vibration caused by the vibration cartridge 50 of the controller 40 Accordingly, mechanical vibration may be generated y the vibration cartridge 50 at the step S10 in FIG. 9, and thereafter vibration is visually given to game images with a delay of 1 or 2 frames or more at the step S4 or S7 in FIG. 9.

For example, when it is detected at the step S101 of FIG. 10 that the player object comes into contact or collision against another object, since intense vibration is generated on a game images, the display 30 is vibrated at the entire screen. In this case, the visual coordinate for a camera stated before may be varied it by it during the camera process of the step S4 in FIG. 9.

When a condition of generating weak vibration is detected at the step S102 or S103 in FIG. 10, weak vibration is generated on the game image. The player object image only is given vibration that is displayed on the display 30 In such a case, a plurality of polygon sets, constituting the player object, may be varied in a center coordinate position it by it in the rendering process at the step S7 in FIG. 9.

Incidentally, whether to give vibration to a game image may be determined by a condition whether "F4=1" is detected at the step S128 in FIG. 12. That is, when the vibration flag F4 is at "1", vibration is given to the game image, while when the flag is at "0", no vibration is generated in the game image.

Although the present invention has been described and illustrated in detail, it is clearly understood that the same is by way illustration and example only and is not to be taken by way of limitation, the spirit and scope of the present invention being limited only by the terms of the appended claims.

What is claimed is:

1. A video game system for playing a video game of a type that provides physical sensations to a player, said video game system comprising:
    a video game machine comprising a counter, and a processor that executes a video game program stored in a video game program storage medium to generate game images displayed on a display;
    a hand-held player controller connected to said video game machine and operable by a player to generate video game control signals for the video game program; and
    a vibration source arranged to vibrate a housing of said hand-held player controller,
    wherein, during execution of the video game program by said processor, said counter is loaded with an initial value in accordance with vibration generating conditions detected during playing of the video game, and
    wherein said vibration source is controlled based on an on/off pattern produced from the counting of said counter so that the housing of said hand-held player controller is selectively vibrated on the basis of the on/off pattern.

2. The video game system according to claim 1, wherein said vibration source is on when the count of said counter exceeds a predetermined counter value and said vibration source is off when the count of said counter is less than the predetermined counter value.

3. The video game system according to claim 1, wherein an increment value for the counting of said counter is determined in accordance with the detected vibration generating conditions.

4. The video game system according to claim 3, wherein a variation of the increment value is also determined in accordance with the detected vibration generating conditions.

5. The video game system according to claim 1, wherein collisions between game objects generated by the video game program are detected as vibration generating conditions.

6. The video game system according to claim 5, wherein collisions between game objects in three-dimensional space are detected as vibration generating conditions.

7. The video game system according to claim 1, wherein accelerations of game objects generated by the video game program are detected as vibration generating conditions.

8. The video game according to claim 1, wherein the game images vibrate at timings related to vibrations of said vibration source.

9. The video game system according to claim 8, wherein the vibrations of the game images are delayed by one or more frames relative to the vibrations of said vibration source.

10. The video game system according to claim 1, wherein said vibration source is removably attached to said hand-held player controller.

11. The video game system according to claim 1, wherein said video game system further comprises a memory space addressable by said processor and said counter is within the memory space.

12. The video game system according to claim 1, wherein said counter is an 8-bit binary counter.

13. The video game system according to claim 1, wherein the counting of said counter is based on the initial value and on an increment value for varying vibration strength which is also determined in accordance with the detected vibration generating conditions.

14. A video game system for playing a video game of a type that provides physical sensations to a player, said video game system comprising:
    a video game machine comprising a processor that executes a video game program stored in a video game program storage medium to generate game images displayed on a display, a memory space addressable by said processor, and a counter within said memory space;
    a hand-held player controller connected to said video game machine and operable by a player to generate video game control signals for the video game program; and
    a vibration source arranged to vibrate a housing of said hand-held player controller,
    wherein, during execution of the video game program by said processor, said counter is loaded with an initial value in accordance with vibration generating conditions detected during playing of the video game, and
    wherein said vibration source is controlled based on an on/off pattern produced from the counting of said counter so that the housing of said hand-held player controller is selectively vibrated on the basis of the on/off pattern.

15. The video game system according to claim 14, wherein said counter is an 8-bit binary counter.

16. The video game system according to claim 14, wherein said vibration source is on when the count of said counter exceeds a predetermined counter value and said vibration source is off when the count of said counter is less than the predetermined counter value.

17. The video game system according to claim 14, wherein an increment value for the counting of said counter is determined in accordance with the detected vibration generating conditions.

18. The video game system according to claim 17, wherein a variation value of the increment value is also determined in accordance with the detected vibration generating conditions.

19. The video game system according to claim 14, wherein collisions between game objects generated by the video game program are detected as vibration generating conditions.

20. The video game system according to claim 19, wherein collisions between game objects in three-dimensional space are detected as vibration generating conditions.

21. The video game system according to claim 14, wherein accelerations of game objects generated by the video game program are detected as vibration generating conditions.

22. The video game according to claim 14, wherein the game images vibrate at timings related to vibrations of said vibration source.

23. The video game system according to claim 22, wherein the vibrations of the game images are delayed by one or more frames relative to the vibrations of said vibration source.

24. The video game system according to claim 14, wherein said vibration source is removably attached to said hand-held player controller.

25. The video game system according to claim 14, wherein the counting of said counter is based on the initial value and on an increment value for determining vibration strength which is also determined in accordance with the detected vibration generating conditions.

\* \* \* \* \*